(12) United States Patent
Sumpf, Jr. et al.

(10) Patent No.: US 10,020,550 B2
(45) Date of Patent: Jul. 10, 2018

(54) ENERGY STORAGE PACK

(71) Applicant: Tesla, Inc., Palo Alto, CA (US)

(72) Inventors: Robert David Sumpf, Jr., San Francisco, CA (US); Ernest Matthew Villanueva, San Francisco, CA (US); David Elias Hegeman, San Jose, CA (US); Satvik Vipin Batavia, Milpitas, CA (US); Ganesh Ramanarayan Singh, Troy, MI (US); Alex Prilutsky, Redwood City, CA (US); Scott Ira Kohn, Redwood City, CA (US); Bruce Phillip Edwards, Menlo Park, CA (US); Peter Thomas Tennessen, Oakland, CA (US); Jayesh Bharat Gorasia, San Francisco, CA (US); Hugh Burnett Ross, San Francisco, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/437,228

(22) Filed: Feb. 20, 2017

(65) Prior Publication Data

US 2017/0162922 A1 Jun. 8, 2017

Related U.S. Application Data

(63) Continuation-in-part of application No. 15/411,154, filed on Jan. 20, 2017, which is a continuation-in-part (Continued)

(51) Int. Cl.
*H01M 10/6556* (2014.01)
*H01M 10/6554* (2014.01)
(Continued)

(52) U.S. Cl.
CPC ..... *H01M 10/6556* (2015.04); *H01M 2/1077* (2013.01); *H01M 10/643* (2015.04); *H01M 10/6554* (2015.04)

(58) Field of Classification Search
CPC ......... H01M 10/6556; H01M 10/6554; H01M 10/643; H01M 2/10; H01M 2/1077;
(Continued)

(56) References Cited

U.S. PATENT DOCUMENTS

| 3,784,411 A | 1/1974 | Ciliberti, Jr. |
| 2006/0078789 A1* | 4/2006 | Wegner ............... H01M 10/625 429/120 |

(Continued)

FOREIGN PATENT DOCUMENTS

CN 205752451 U 11/2016

OTHER PUBLICATIONS

International Search Authority; International Application No. PCT/IB2018/050344; Invitation to Pay Fees and, Where Applicable, Protest Fee; Partial International Search Report; Apr. 23, 2018; 11 pgs.

*Primary Examiner* — Karie O'Neill Apicella
(74) *Attorney, Agent, or Firm* — Garlick & Markison; Bruce E. Garlick

(57) ABSTRACT

An energy storage pack includes a coolant inlet manifold, a coolant outlet manifold, and a plurality of thermal-exchange tubes extending between the coolant inlet manifold and the coolant outlet manifold to exchange heat between coolant passing through the plurality of thermal-exchange tubes and a plurality of battery cells mounted adjacent to and among the plurality of thermal-exchange tubes within the energy storage pack. In one embodiment, at least one of coolant inlet manifold and the coolant outlet manifold includes a plurality of thermal-exchange tube terminating structures (Continued)

and a plurality of hose segments intercoupling the plurality of thermal-exchange tube terminating structures. The energy storage pack may further include a coolant inlet opening located on the coolant inlet manifold and a coolant outlet opening located on the coolant outlet manifold.

21 Claims, 24 Drawing Sheets

Related U.S. Application Data of application No. 14/056,552, filed on Oct. 17, 2013, now Pat. No. 9,577,227.

(51) Int. Cl.
 *H01M 10/643* (2014.01)
 *H01M 2/10* (2006.01)

(58) Field of Classification Search
 CPC ......... H01M 10/5055; H01M 10/5016; H01M 10/5075; H01M 10/5059
 See application file for complete search history.

(56) References Cited

U.S. PATENT DOCUMENTS

| | | |
|---|---|---|
| 2007/0009787 A1 | 1/2007 | Straubel et al. |
| 2008/0311468 A1 | 12/2008 | Hermann et al. |
| 2009/0023056 A1 | 1/2009 | Adams et al. |
| 2010/0092849 A1* | 4/2010 | Wood .................. H01M 2/1072 429/99 |
| 2010/0104938 A1 | 4/2010 | Hermann |
| 2010/0151308 A1 | 6/2010 | Hermann et al. |
| 2011/0091760 A1 | 4/2011 | Straubel et al. |
| 2011/0165446 A1 | 7/2011 | Hermann |
| 2011/0212355 A1 | 9/2011 | Essinger et al. |
| 2011/0212356 A1 | 9/2011 | Tennessen et al. |
| 2011/0214808 A1 | 9/2011 | Hermann et al. |
| 2012/0030932 A1 | 2/2012 | Hermann et al. |
| 2012/0037310 A1 | 2/2012 | Hermann et al. |
| 2012/0161472 A1 | 6/2012 | Rawlinson et al. |
| 2013/0196184 A1 | 8/2013 | Faass et al. |
| 2015/0111082 A1 | 4/2015 | Sumpf et al. |

* cited by examiner

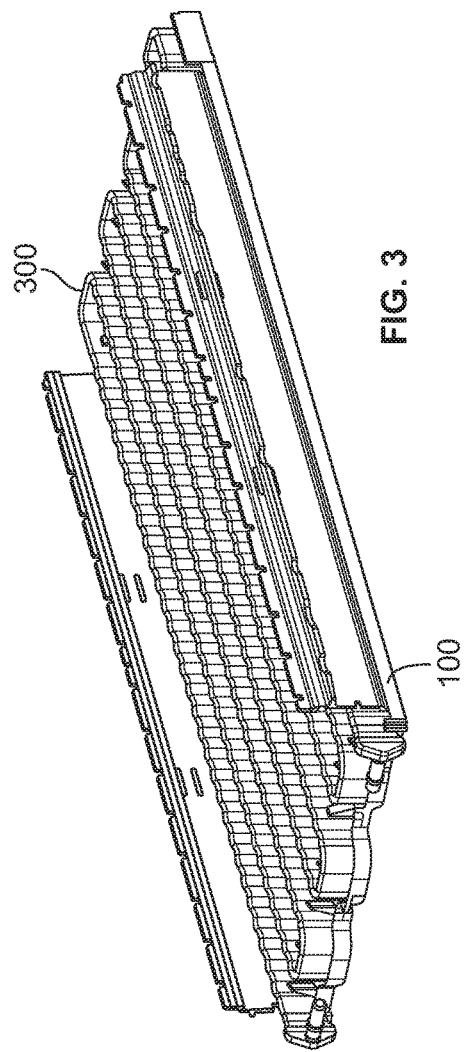
FIG. 3
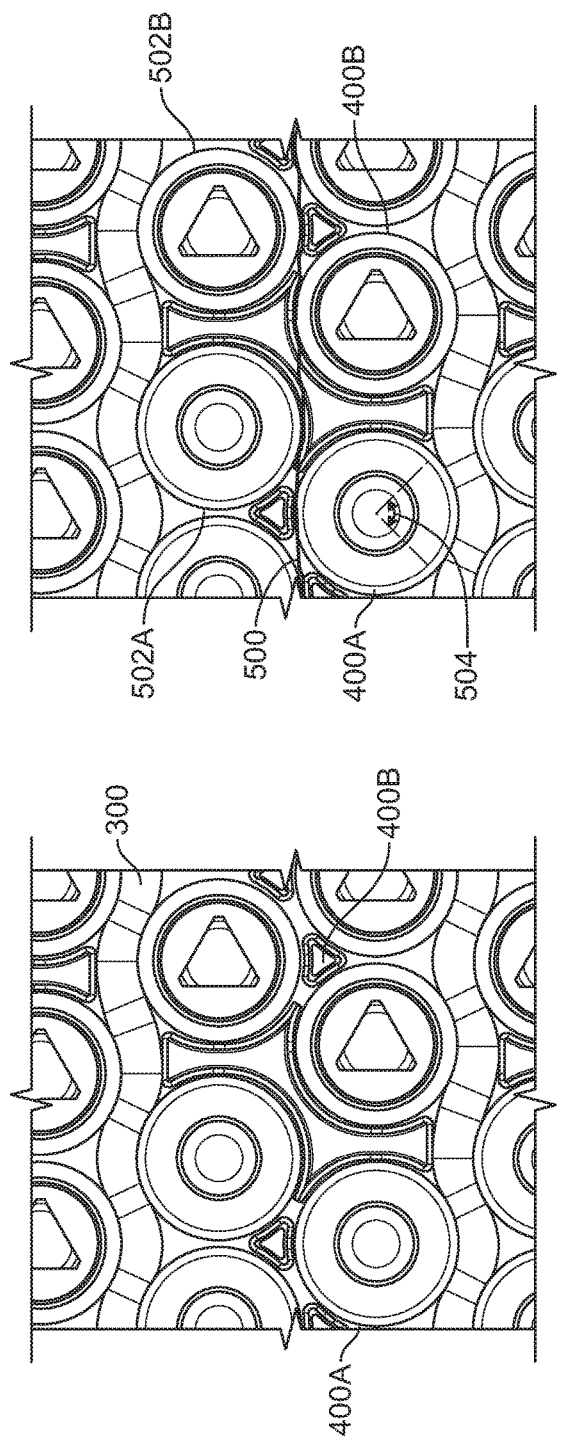
FIG. 4
FIG. 5

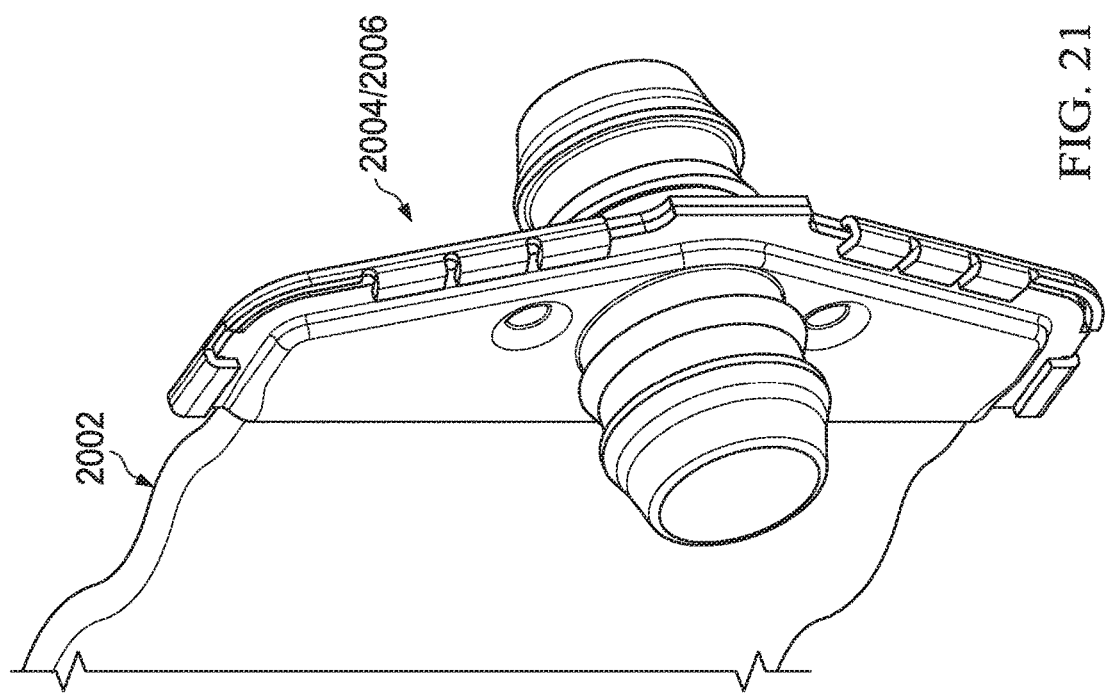

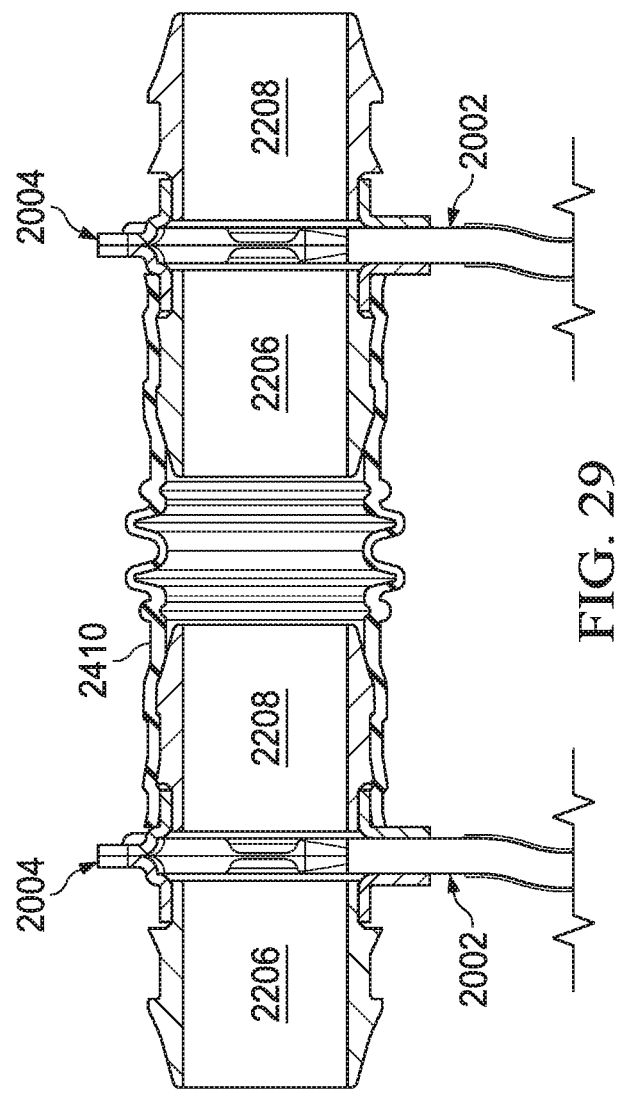

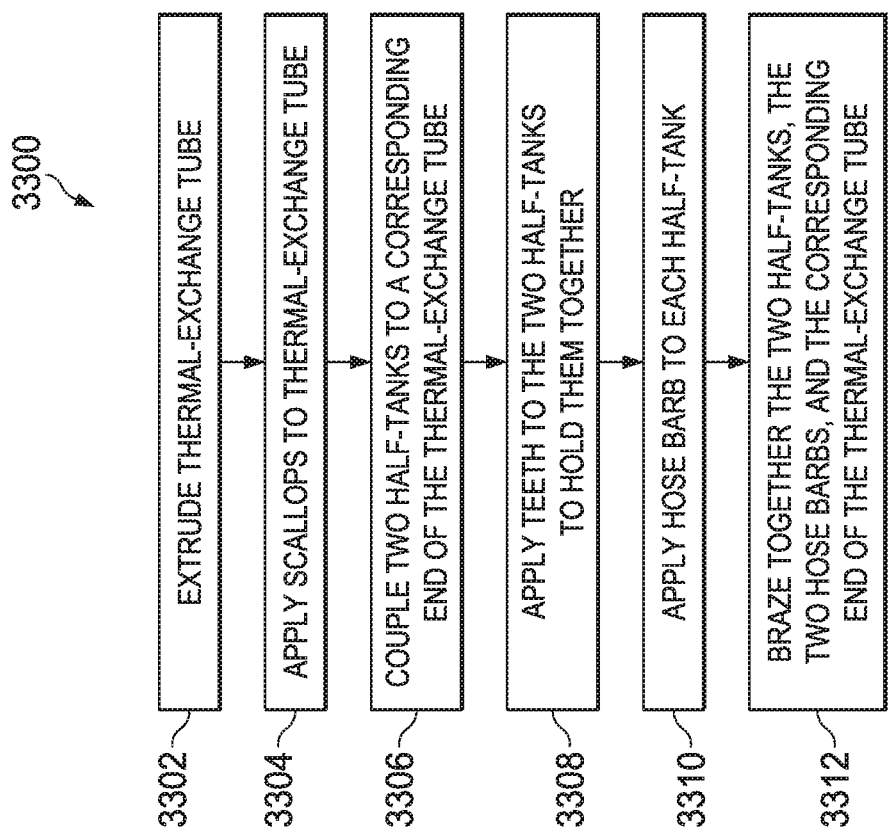

ENERGY STORAGE PACK

CROSS-REFERENCE TO RELATED APPLICATION

The present U.S. Utility Patent Application claims priority pursuant to 35 U.S.C. § 120 as a continuation-in-part of U.S. Utility patent application Ser. No. 14/056,552 entitled "CELL MODULE ASSEMBLIES," filed Oct. 17, 2013, scheduled to issue as U.S. Pat. No. 9,577,277 on Feb. 21, 2017, and U.S. Utility patent application Ser. No. 15/411,154 entitled "ENERGY STORAGE SYSTEM," filed Jan. 20, 2017, both of which are hereby incorporated herein by reference in their entirety and made part of the present U.S. Utility Patent Application for all purposes.

BACKGROUND

Some energy storage systems (e.g., energy storage packs) pump a cooling fluid through a cooling tube in between or near the energy-storing cells. One aspect of the thermal architecture of such an energy storage system is the thermal resistance between the cells and the heat transfer fluid contained within the cooling tube. Thermal interface materials (TIMs) can be used for bridging the physical gap between the cell and the cooling tube. In the past, cells have been populated inside a plastic housing, a straight cooling tube has been run between cell rows, and the interior has been flooded with a thermally conductive epoxy. Such epoxy may be high-cost and high-mass, with large conduction path lengths. In another approach, appropriate thermal resistance has been obtained using a high-cost, compressible silicone sponge TIM applied to a scalloped cooling tube.

BRIEF DESCRIPTION OF THE DRAWINGS

FIG. 3 shows an example of a thermal-exchange tube assembled in the module housing of FIG. 1.

FIG. 4 shows an example of the thermal-exchange tube of FIG. 3 running between rows of cells assembled in the module housing.

FIG. 5 shows an example of a cell spreader element between rows of the cells from FIG. 4.

FIG. 21 is a partial perspective view of the thermal-exchange tube and thermal-exchange tube terminating structure of FIGS. 20A and 20B.

FIG. 29 is a partial cross-sectional view of an end of the thermal-exchange tube and thermal-exchange tube terminating structure of FIG. 24 detailing the interconnection between thermal-exchange tube terminating structures by a hose segment.

FIG. 33 is a flow chart illustrating a method for constructing a combined thermal-exchange tube/thermal-exchange tube terminating structure.

DETAILED DESCRIPTION

This document describes systems and techniques involving modules for cells of an energy storage pack, such as an energy storage pack. Modules can be used with mounts for attaching them in the energy storage pack. A thermal-exchange tube—i.e., a cooling and/or heating tube—can be provided so that each cell datums to the module housing by the tube, rather than by structure in the housing. The tube can be affixed to the module housing using the same application of adhesive as the cells, and radiation (e.g., UV light) can be used for adhesive curing. For areas where the applied adhesive is shadowed from the radiation, a secondary cure mechanism can be used. The module housing allows flexibility in use of cells, for example accepting cells of different types, cells in different positions, or placeholders instead of some cells. The tube can be provided with internal ribs that are curved or slanted to improve manufacturability and thermal/fluid performance when sharp bends are made in the tube.

Figure 1:
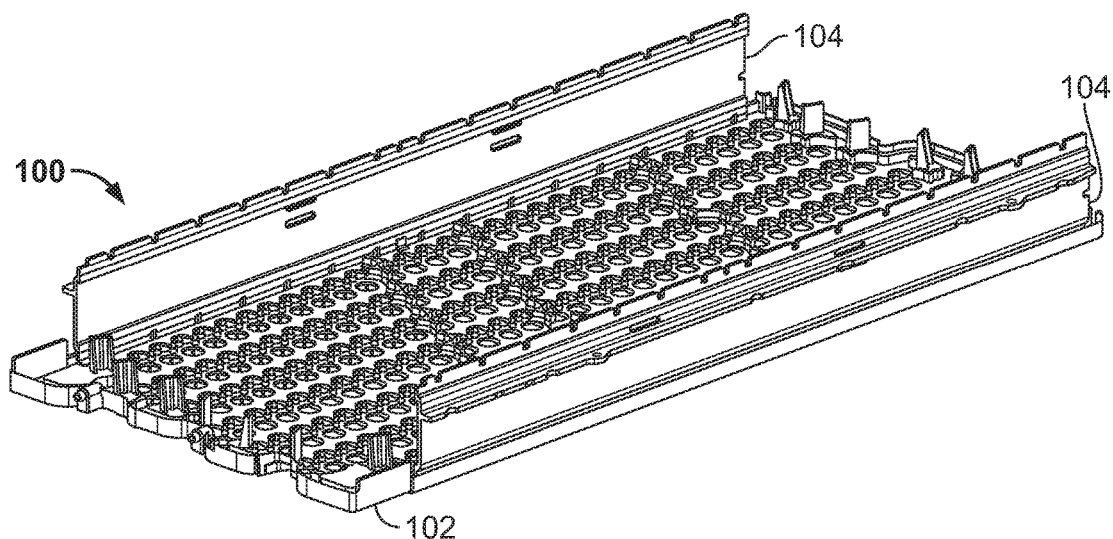
FIG. 1 shows an example of a module housing that includes a clamshell and mounts.

FIG. 1 shows an example of a module housing 100 that includes a clamshell 102 and mounts 104. The clamshell is configured for holding cells that are assembled into an energy storage pack. The energy storage pack of an electric vehicle can consist of an overall enclosure (not shown), inside which one or more modules based on the module housing 100 are to be mounted after being assembled.

The clamshell 102 can be made from any suitable material, including, but not limited to, metal, polymer or a composite. In some implementations, the clamshell 102 is considered a "non-terminal side" clamshell. The term non-terminal side here refers to one end of the module (sometimes considered the lower end) that does not have connection points for interconnecting multiple modules into a pack. By contrast, another clamshell on the opposite side of the module can then be characterized as a "terminal side" clamshell.

The mounts 104 are inserted, here with one on each longer side of the clamshell 102. After assembly, the mounts can provide for easy and reliable mounting of the module, such as inside the enclosure of an energy storage pack. The mounts fit inside slots on the clamshell and will be affixed using adhesive, which will be described in examples below. The mounts can be made from any suitable material, including, but not limited to, metal, polymer or a composite.

Figure 2:
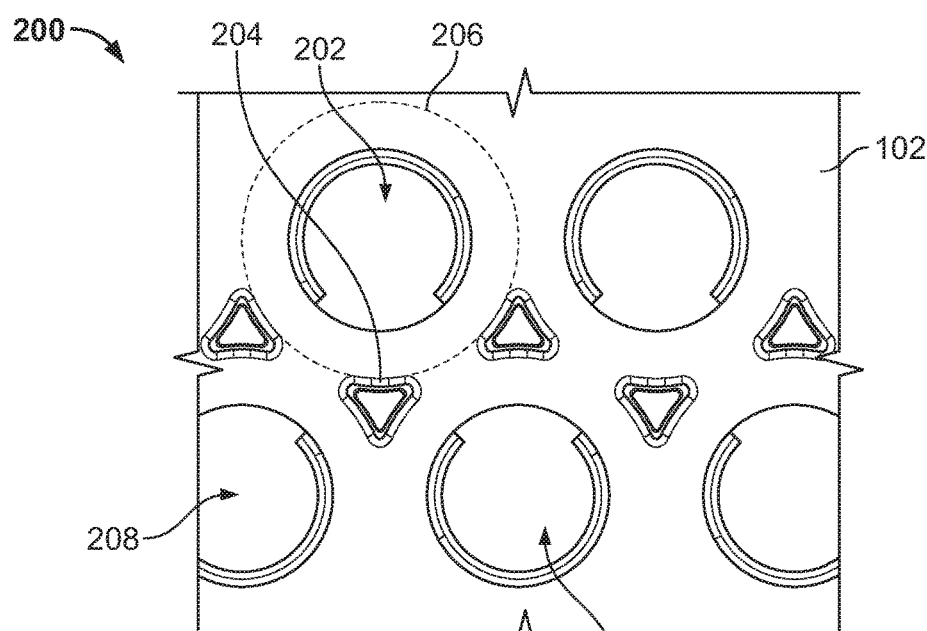
FIG. 2 shows an example of structure on the clamshell of FIG. 1.

FIG. 2 shows an example of structure 200 on the clamshell 102 of FIG. 1. First, the clamshell has an opening 202 for each of the cells. For example, the opening can be a through-hole to be used for interconnecting the cell. Second, the structure here includes three triangle shapes 204 that protrude slightly above the overall surface of the clamshell. In some implementations, the triangle shapes can have essentially a pyramid form in three dimensions.

Here, the triangle shapes 204 are positioned approximately on one half of a circle 206. The triangle shapes reflect the shape of an essentially cylindrical cell (e.g., cells of type 18650). In a sense, the circle as defined by the triangle shapes can be considered a counterbore for the cell (not shown). More particularly, the counterbore can be oversized relative to the footprint of the cell. As a result, the cell is not datumed to its position by the triangle shapes. Rather, the cell will be datumed by a thermal-exchange tube, and examples of this will be described below. However, when adhesive is applied to affix the cells to the clamshell 102, the adhesive will at least partially fill the gap between the side surface of the cell and the triangle shape. In other words, the structures on the clamshell can serve a role in the secure attachment of the cells. A triangle shape can serve as structure for two or more openings; for example, the triangle shape 204 also defines the respective counterbores for openings 208 and 210.

FIG. 3 shows an example of a thermal-exchange tube 300 assembled in the module housing 100 of FIG. 1. Here, the tube is an essentially flat conduit that is configured for transporting a liquid between rows of the cells (not yet assembled) so as to remove heat generated during battery operation, and thereby cool the cells, or heat up the cells to a desired operating temperature with a liquid heater (not shown). That is, the tube can also or instead provide heating. For example, the liquid can be circulated using a pump (not shown) at either end of the tube when cooling or heating is needed.

Figure 19:
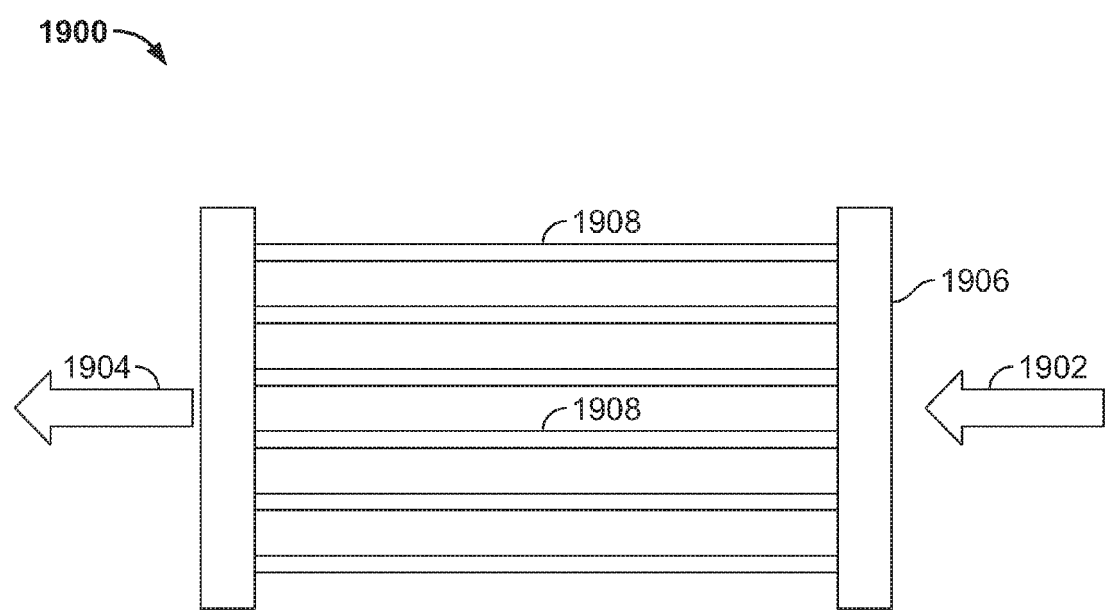
FIG. 19 shows an example of a parallel cooling tube system.

In some implementations, the tube can be datumed to the clamshell on the outer two runs. In between the outer runs, the tube can pass back and forth and reverse direction when it reaches the short end of the clamshell. As another example, rather than the tube reversing direction, separate parallel tubes can be provided, such as illustrated in FIG. 19 below. In this implementation, the tube is scalloped, and in a sense completes the counterbores (e.g., the half-circles defined by the triangle shapes 204 in FIG. 2).

FIG. 4 shows an example of the tube 300 of FIG. 3 running between rows of cells 400A-B assembled in the module housing. In assembly, the cells are populated into the counterbores. At that stage, the nominal position of the cells is flush with the scallops of the tube, but the cell position is not tightly controlled. The counterbore is oversized so as not to constrain the position of the cells.

One advantage of this assembly technique is that it allows for the use of cells of different types. In a worst-case scenario when there is cell-to-tube and tube-to-clamshell misalignment, the counterbores nevertheless provide enough clearance to avoid constraining the cells. For example, the positive ends of 18650-type cells by different manufacturers differ significantly from each other, as do the negative ends, but the diameters of the cell cans are nevertheless sufficiently similar that the tube 300 can be used with each of them.

Another advantage is that there is flexibility in the orientation of cells. For example, the cell 400A has its negative terminal facing upward, whereas for the cell 400B it is the positive terminal. That is, the module housing can be used with cells in an upward orientation, or a downward orientation, or some in each orientation.

FIG. 5 shows an example of a cell spreader element 500 between rows of the cells 400A-B from FIG. 4. That is, the cell spreader element is inserted so that it spaces apart, on the one hand, the row containing the cells 400A-B from, on the other hand, the row containing cells 502A-B. The cell spreader element biases each cell into position within the module, wherein the cell datums to the tube. The cell spreader can function as a thermal barrier to impede heat transfer between the cells. The cell spreader element can be made of any material suitable for spreading cells apart in the module housing, such as to provide enough side-force to readjust the cell to its proper position. In some implementations, the cell spreader element can be a fiberglass element, for example coated with polytetrafluoroethylene.

A contact angle 504 can be defined that indicates how much of the cell's cylindrical surface contacts the tube. This angle can depend on a number of characteristics, including, but not limited to, the cell radius, the forming of the tube, and the stiffness of the cell spreader element, to name just a few examples. Here, the contact angle is less than 90 degrees. For example, a contact angle of about 60-70 degrees can be used.

Figure 6:
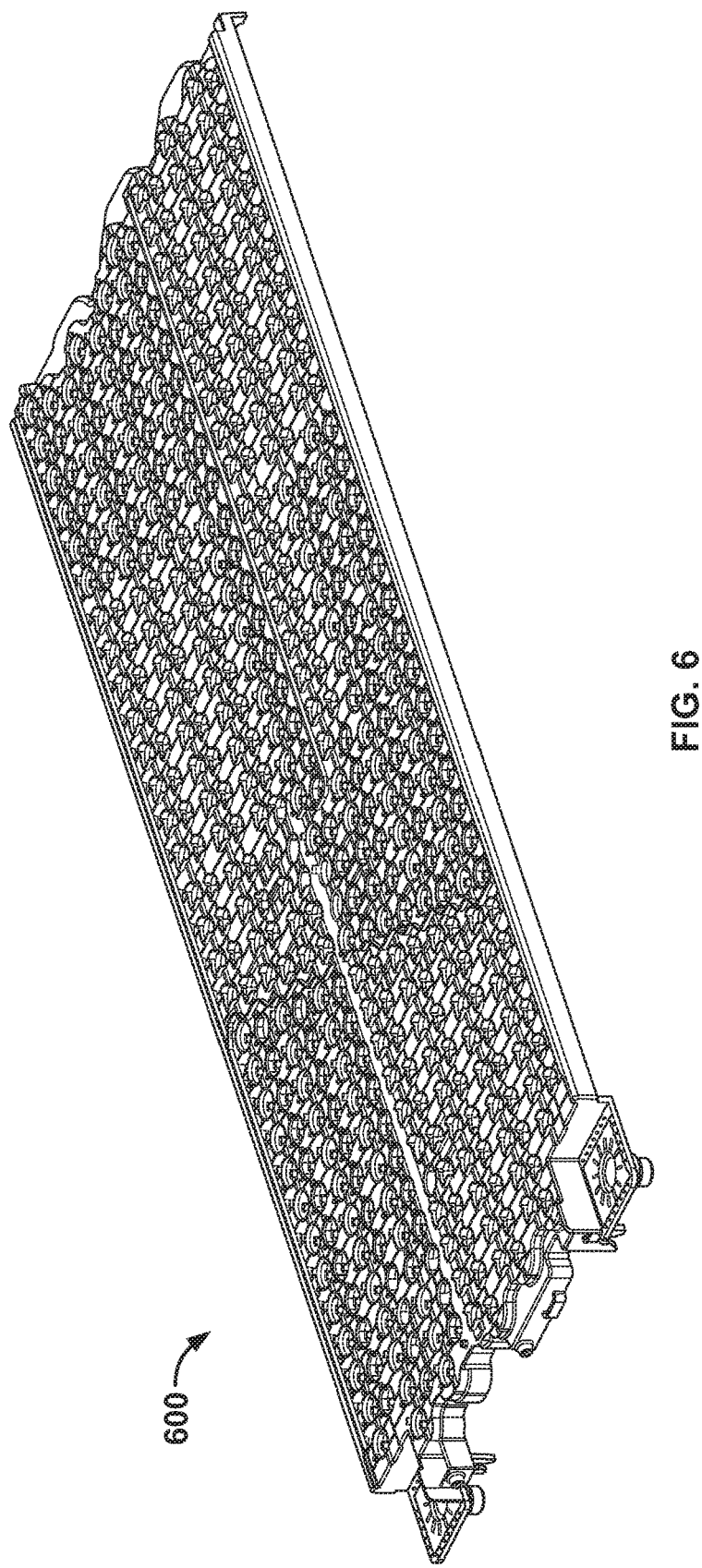
FIG. 6 shows an example of a second-side clamshell.

FIG. 6 shows an example of a second-side clamshell 600. In some implementations, the second-side clamshell 600 can be considered a "terminal side" clamshell. That is, the second-side clamshell 600 can be the complementary housing to the clamshell 102 (FIG. 1), for example to provide a top for the module when the cells have been assembled therein.

Figure 7:
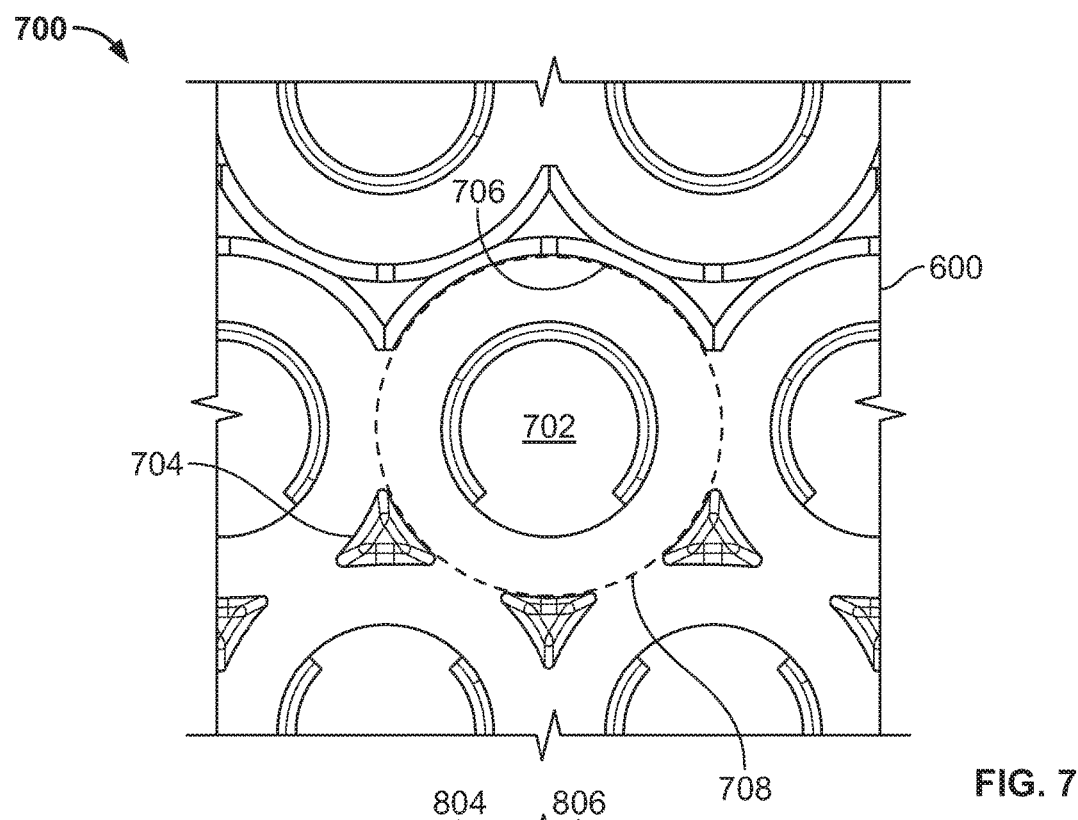
FIG. 7 shows structure on the clamshell of FIG. 6.

In some implementations, the second-side clamshell 600 can have one or more features identical or similar to those of the other clamshell. The second-side clamshell 600 can have structures that reflect the row-wise cell arrangement described above. FIG. 7 shows structure 700 on the second-side clamshell 600 of FIG. 6. For example, the structures here include an opening 702 for each of the cells, and three triangle shapes 704 that can be identical or similar to those of the other clamshell. The second-side clamshell 600 here also has structure 706, which together with the triangle shapes 704 forms a counterbore, as schematically indicated by a circle 708. Such counterbore can be oversized, in analogy with the above description of the counterbores in the lower clamshell. As another example, the second-side clamshell 600 can have one or more slots for attachment of a mount.

Figure 8:
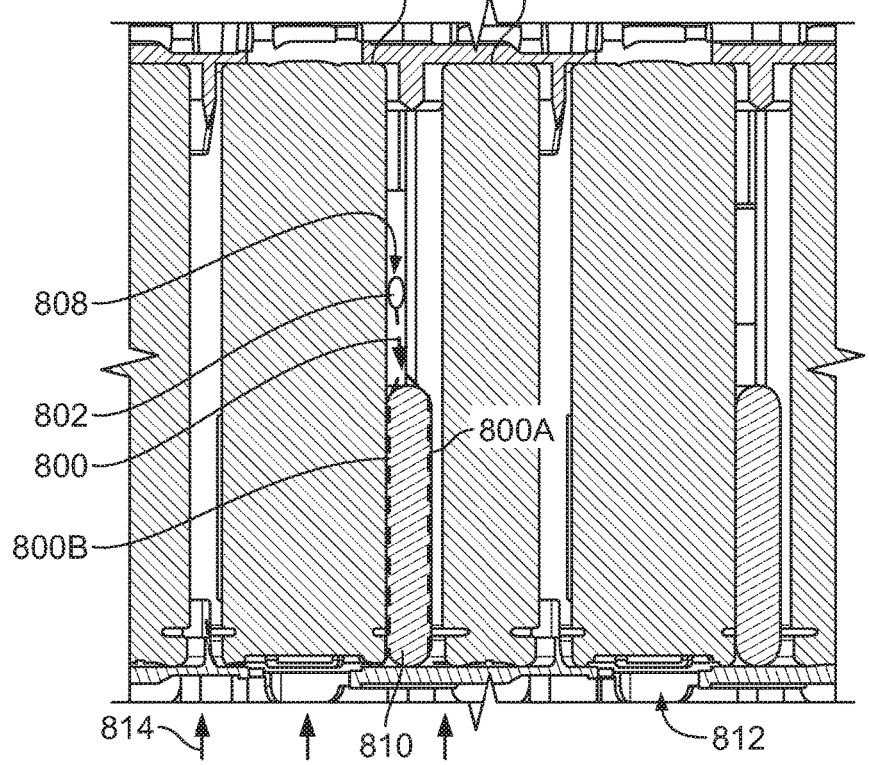
FIG. 8 schematically shows an example of applying adhesive to affix the thermal-exchange tube and the cells to the module housing.

FIG. 8 schematically shows an example of applying adhesive to affix the tube and the cells to the module housing. The adhesive is here schematically illustrated as a dashed line 800 that is dispensed by a stinger 802 between rows of cells 804 and 806. Each cell is offset along the length of the tube with regard to its neighbor (see, e.g., the cell pattern in FIGS. 4-5) and the cell 806 therefore appears narrower than the cell 804 in the current cross section. The stinger 802 can be an elongate nozzle configured to fit between the cell rows in a space that is here referred to as a stinger alley 808. For example, the stinger can begin at either end of the alley and thereafter be moved along the alley, continuously or in discrete steps, as the adhesive is being dispensed.

The adhesive 800 flows down toward the lower clamshell on both sides of tube 810. At the bottom of each cell is an opening 812 in the clamshell (e.g., opening 202 in FIG. 2). A measure can be taken to prevent the adhesive from flowing out the opening, or at least reduce the amount of such adhesive. In some implementations, a radiation-sensitive adhesive is used and radiation can then be applied below the module, as schematically indicated by arrows 814, to cure the adhesive. The clamshell(s) can be partially or fully transparent to such radiation. For example, a single or multi-component UV-cure acrylate or acrylate-epoxy adhesive can be used, and ultraviolet light can then be applied to prevent or reduce outflow of adhesive through the opening 812.

The adhesive wicks into the narrow space between cells and the tube, as illustrated by paths 800A and 800B. However, if the cell and/or the tube lacks significant transparency to the radiation, the paths 800A-B will essentially be shadowed during the radiation process. As a result, the adhesive that is present along the paths 800A-B could remain uncured (e.g., essentially liquid), significantly longer than that at the bottom of the cell. That is, the radiation may not be effective in curing the adhesive in such locations.

The adhesive can therefore be chosen so that it can also be cured by a measure other than radiation. In some implementations, the adhesive is curable also by one or more chemicals. For example, a two part adhesive can be mixed prior to dispensing and will chemically cure in the shadowed areas without radiation over time. The adhesive can also contain an aerobic or moisture cure mechanism such that the adhesive cures over time when exposed to air.

As a result, the adhesive is cured also in the areas corresponding to the paths 800A-B. The adhesive is more thermally conductive than the displaced interfacial air, and therefore provides an improved thermal interface between the individual cells and the tube. As such, the adhesive can be considered a thermal interface material that helps the tube transfer energy to and from the cells. That is, in some implementations a thermal interface material other than the adhesive (e.g., a silicon sponge material) need not be applied to the tube or the cells. Rather, the adhesive can perform also this function in addition to affixing the cells and the tube to each other and to the clamshell(s).

Figure 9:
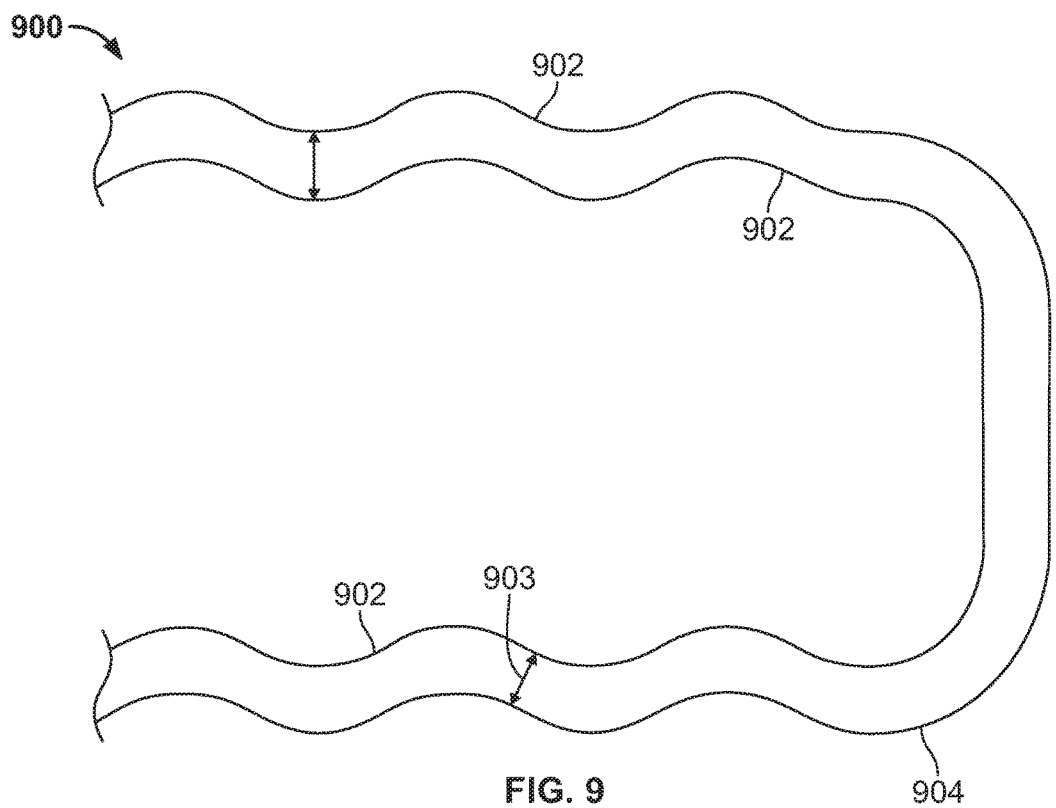
FIG. 9 shows an example of a thermal-exchange tube with scallops.

FIG. 9 shows an example of a tube 900 with scallops 902. In some implementations, the tube is extruded (e.g., from aluminum) in a straight shape, and the scallops are applied before the tube is bent into the necessary shape (e.g., to correspond to the rows of cells). For example, pressure can be applied on the side(s) of the tube, at a certain press tonnage, using a press. When the extrusion width is 3.0-5.0 mm, the scallop compression can be about 25%, to name just one example. A minimum scallop width is indicated by arrow 903. In these implementations, the scalloped tube is thereafter bent into shape, for example corresponding to bends 904 in one or more places on the tube. For example, scalloping can be performed everywhere on the tube except where the bends 904 are to be located. The bends 904 can correspond to the place where the tube arrives at the end of one row, and turns around to run down the next row.

Once finished, the tube 900 can be placed in the clamshell (e.g., as illustrated in FIG. 3) and thereafter the cells can be assembled into the rows defined by the tube. That is, the cells can be datumed to the tube, and not directly to any counterbore or other structure on the clamshell, to name just one example.

In other implementations, the bending can be done before the scalloping. For example, the tube 900 can be bent into the shape that corresponds to the intended cell rows of the clamshell—that is, with linear row portions separated by turns—and thereafter the row portions can be pressed into the scallop shape.

Figure 10A:
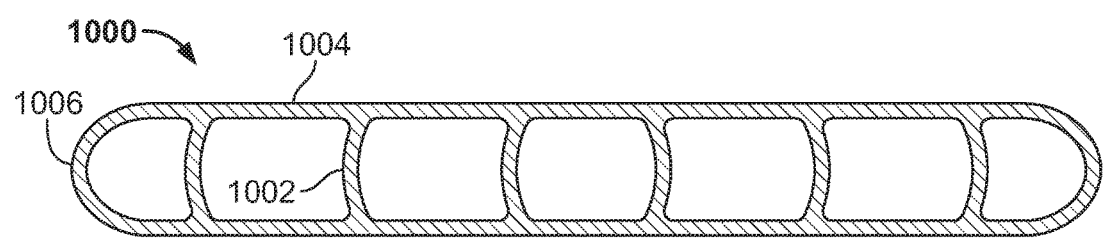
FIGS. 10A-F show example cross sections of thermal-exchange tubes.
Figure 10B:
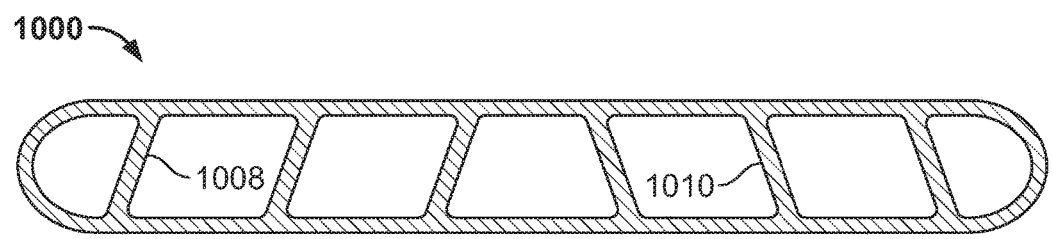

In some implementations, one or more internal features can be provided in a tube. FIGS. 10A-F show example cross sections of a tube 1000. In FIG. 10A, six pre-bent ribs 1002 are provided in the tube. That is, the tube has an elongate cross section with two essentially parallel main side surfaces 1004, and the pre-bent ribs 1002 connect the main side surfaces to each other. The internal ribs are non-perpendicular to the main side surfaces. In this example, each of the pre-bent ribs 1002 curves outward toward a nearest edge 1006 of the tube. Here, the pre-bent ribs have an outer radius essentially equal to the extrusion width.

Figure 10C:
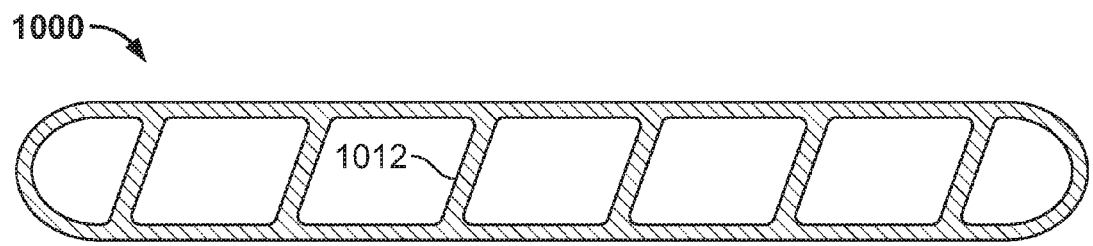

In some implementations, each of the internal ribs is straight and slanted relative to the main side surfaces. For example, in FIG. 10B the tube 1000 has ribs 1008 that are angled in one direction, and other ribs 1010 that are angled in another direction. In FIG. 10C, by contrast, the tube 1000 has ribs 1012 that are all angled in the same direction.

Figure 10D:
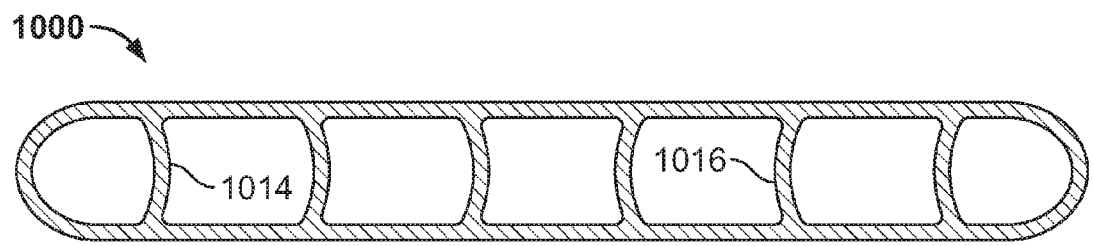
Figure 10E:
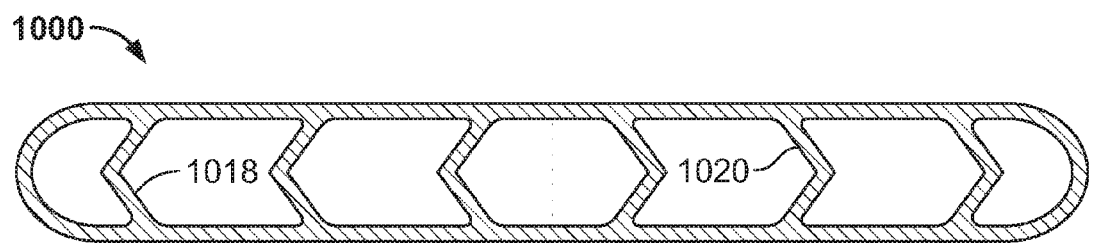
Figure 10F:
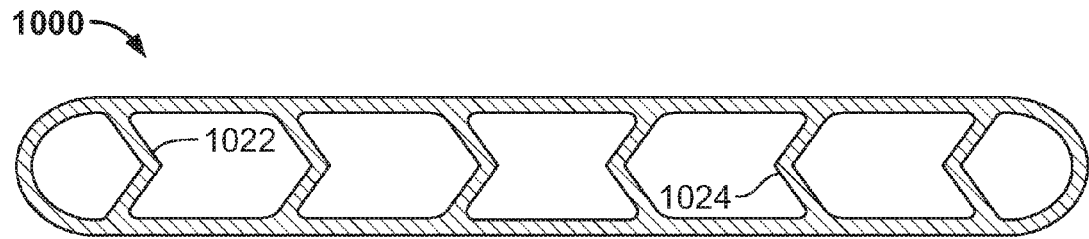

FIG. 10D shows an example where the tube 1000 has curved ribs 1014 that are oriented in one direction (i.e., concave toward the edge of the tube) and curved ribs 1016 that are oriented in another direction. In some implementations, one or more ribs in the tube 1000 has a knee. In FIG. 10E, ribs 1018 and 1020 are pointing away from each other (i.e., toward the edges of the tube), and in FIG. 10F ribs 1022 and 1024 are pointing toward each other.

In the illustrated examples, all ribs are curved or angled to the same degree. For example, in FIG. 10A the radius of the pre-bent ribs 1002 is the same for all of them, and in FIG. 10B the ribs 1008 and 1010 are all slanted at the same angle.

In other implementations, one or more ribs can have a curvature and/or angle that is different from another rib.

The tube 1000 can be made from any material suitable for carrying one or more coolant liquids, for being affixed using the intended adhesive(s), and for having scallops formed therein. In some implementations, the tube is made from aluminum or a polymer. In some implementations the tube is composed of two or more separate parts such as an aluminum part used for coolant transport and a polymer part for electrical isolation. For example, the tube can be manufactured by an extrusion process. In the case of a polymer tube, other manufacturing methods such as blow molding can be used.

Figure 11:
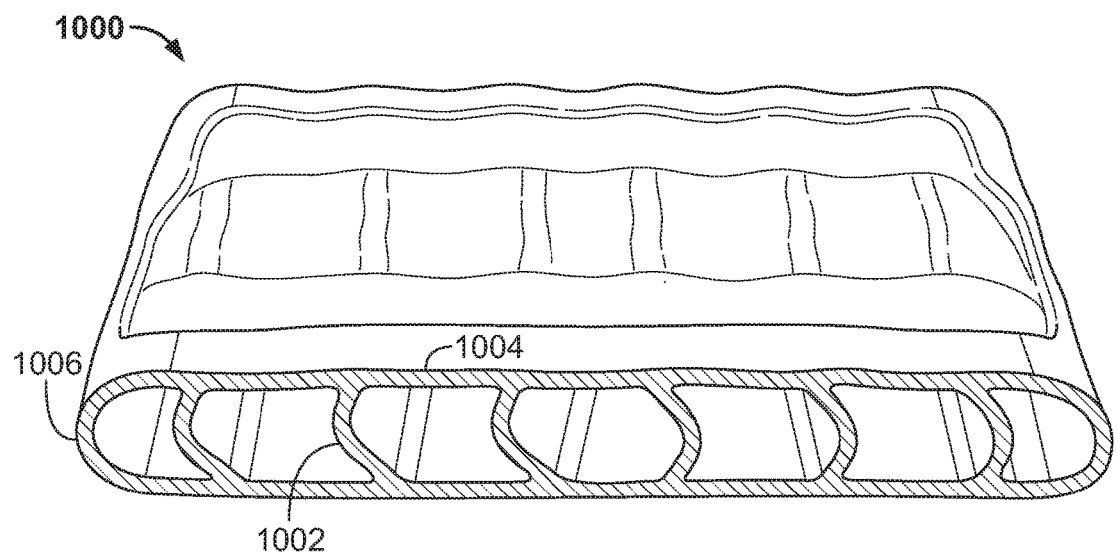
FIG. 11 shows a cross section of an example deformation of the thermal-exchange tube in FIG. 10A.

When the tube 1000 is bent into the configuration that it needs to have for the particular clamshell, one or more of the internal features can be bent or otherwise deformed as a result. FIG. 11 shows a cross section of an example deformation of the tube 1000 as it was shown in FIG. 10A. That is, the tube was first bent in at least one place, and the current illustration shows the interior of the tube where it was bent. Here, the main side surfaces 1004 and the edges 1006 are essentially unaffected by the bending. However, some or all of the pre-bent ribs 1002 has been further bent or otherwise deformed. For example, the pre-bent ribs can flex at their midpoints and yield in a consistent, predictable way with low force. This can provide a more controlled rib collapse, for example when the tube is being bent.

Figure 12:
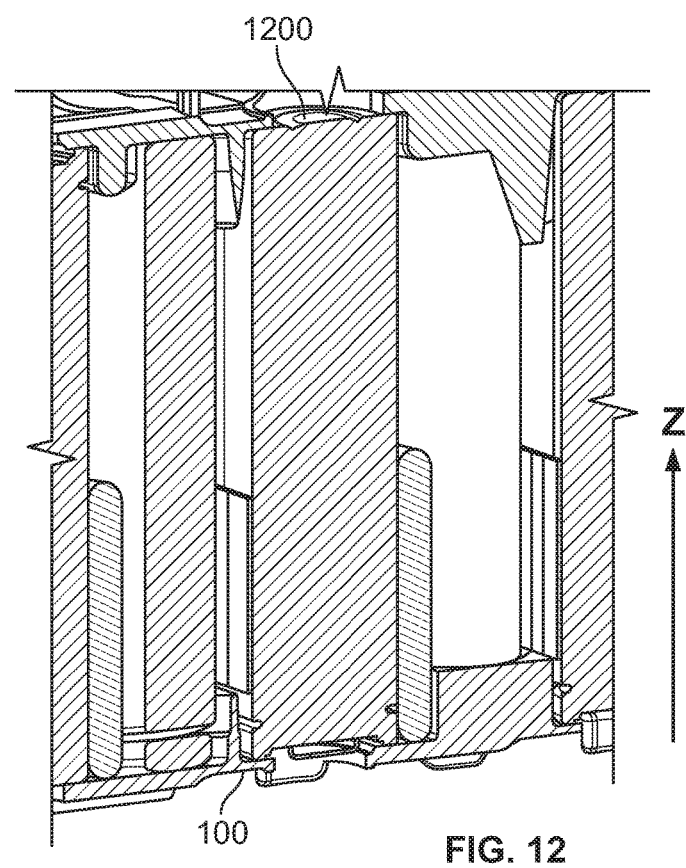
FIG. 12 shows that a cell datums to the module housing along a z-axis.

FIG. 12 shows that a cell 1200 datums to the module housing 100 along a z-axis. That is, the cell is positioned vertically by the clamshell.

Figure 13:
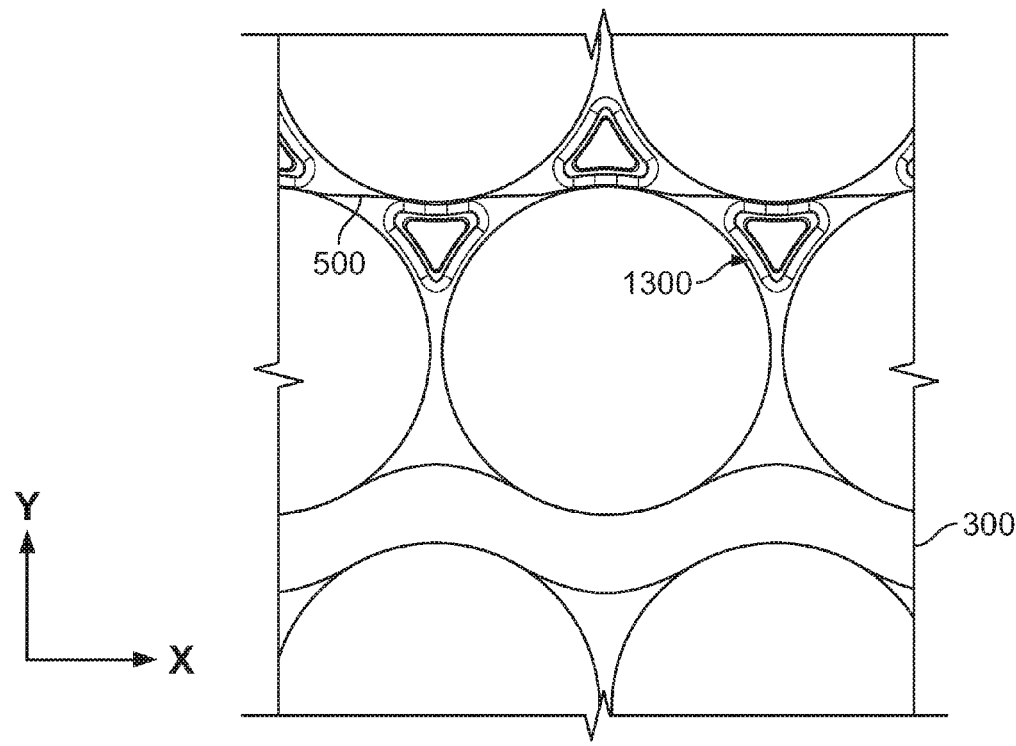
FIG. 13 shows that a cell datums to the thermal-exchange tube along x- and y-axes.

FIG. 13 shows that a cell 1300 datums to the tube 300 along x- and y-axes. That is, the cell is positioned horizontally by the tube and, in this example, the cell spreader element 500. For example, this datuming is reflected by a relatively large cell-to-clamshell clearance 1300. When adhesive is applied, it can partially or completely fill the cell-to-clamshell clearance.

Figure 14:
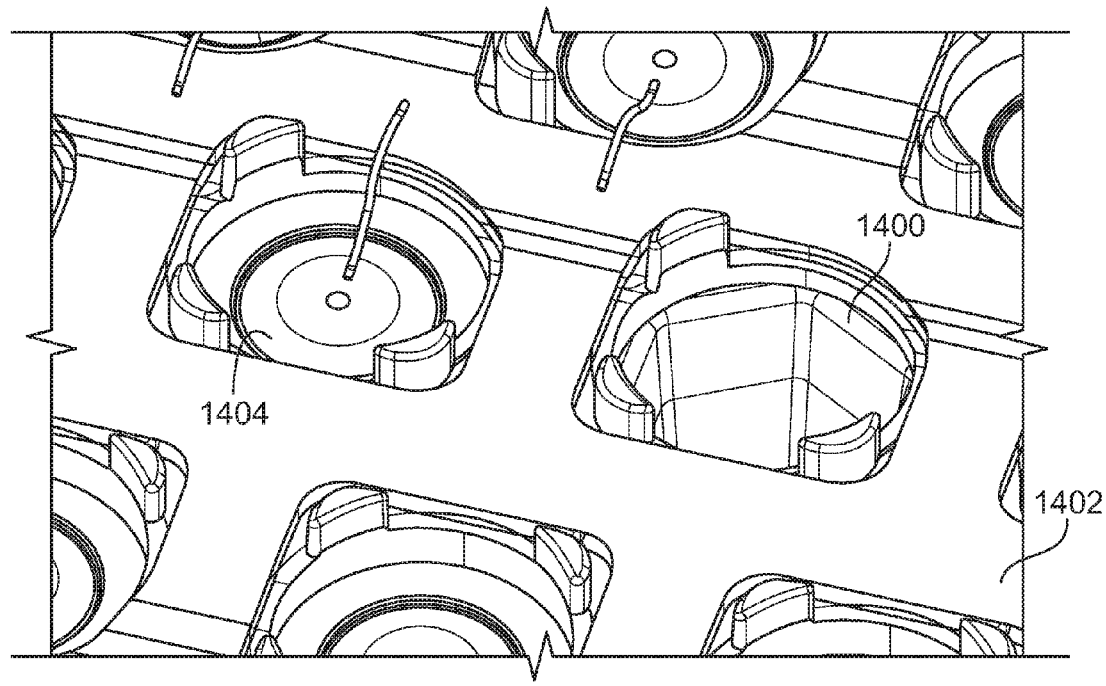
FIG. 14 shows an example of using a placeholder to reduce energy storage pack capacity.

FIG. 14 shows an example of using a placeholder 1400 to reduce energy storage pack capacity. From a marketing perspective, it can be advantageous to offer multiple levels of battery capacity in an energy storage pack that has the same overall form factor. This allows for the reuse of many energy storage pack components and leveraging the testing and validation but still providing different battery capacities and costs. For example, this can allow a manufacturer to offer the customer the option of purchasing the same vehicle with either a standard battery capacity or an extended battery capacity.

A clamshell 1402 here shows that multiple cells 1404 have been assembled within the module housing. The placeholder 1400, however, is a non-energy element that is inserted instead of one of the cells 1404. For example, this can be used to reduce the capacity of the energy storage pack while maintaining structural integrity. The placeholder can be a generic piece that interfaces with the clamshells in the z-dimension, and with the tube (obscured) in the x- and y-dimensions. For example, use of the placeholder can prevent adhesive seepage via the cell interconnect through hole in the lower clamshell.

As another example, flexibility in cell positioning can be provided. If clamshell counterbores are oversized in the x- and y-dimensions, and contain no features that interface with particular cell geometry, then the cell can be inverted within the same module housing. For example, the clamshell may have through holes (e.g., the opening 202 in FIG. 2) that are intended for electrically interconnecting the cells to each other or to another component, and such through holes can be essentially the same diameter for both positive and negative cell terminals. This clamshell configuration can provide a hole diameter that is adequate both for exposing the bottom vent on the cell's negative terminal, and for providing room for the positive cell terminal to slightly protrude, without crashing with the structure that forms the through hole. For example, this can provide for polarity switch at any time, such as due to programmatic changes or physical packaging needs without having to redesign the module or making a major change in the module factory.

Figure 15:
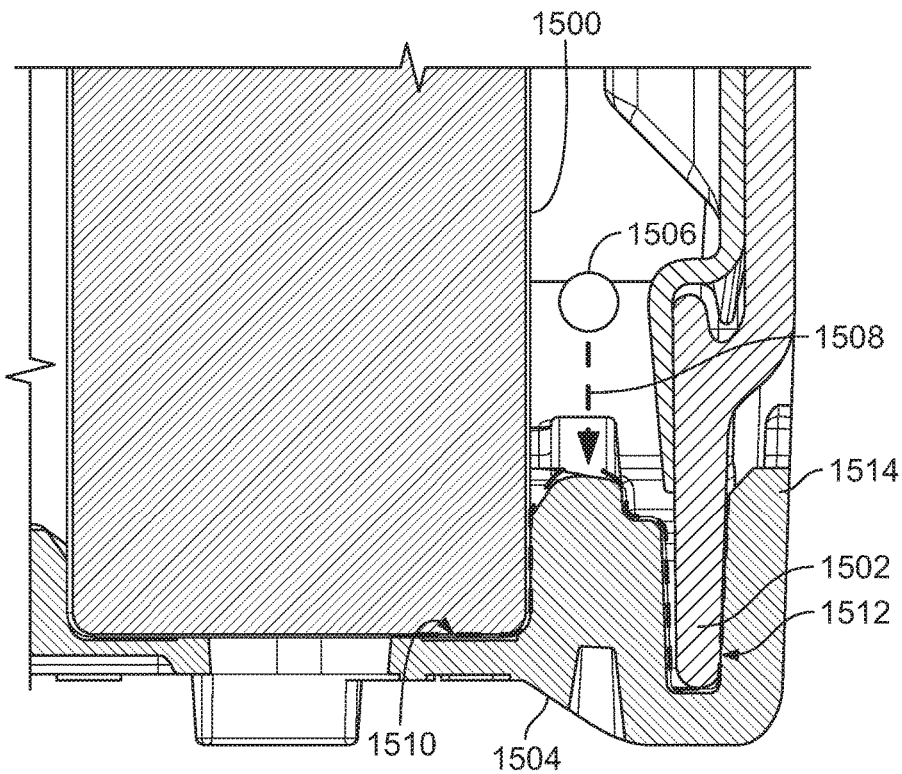
FIG. 15 shows an example of applying adhesive to affix a cell and a mount to a clamshell.

FIG. 15 shows an example of applying adhesive to affix a cell 1500 and a mount 1502 to a clamshell 1504. Here, the adhesive is applied using a stinger 1506. The flow of adhesive is generally indicated by an arrow 1508. The adhesive wicks into places that are not easily reached by mechanical equipment. For example, the adhesive reaches an area 1510 underneath the cell, and also an area 1512 that is shielded by the flange of the mount 1502. As such, the application of the adhesive here serves both to affix the cell and to affix the mount to the module housing (e.g., to the clamshell). Similar to examples described above, the adhesive can be cured in a multi-step process: radiation such as UV light can be applied, and a chemical reagent, or an aerobic or moisture cure mechanism can provide curing in areas that were shadowed when the radiation was applied.

The above technique can provide advantageous datuming of the mount 1502. In some implementations, the tube (or any material applied to its outside) can set the mount against a datum rib 1514 on the clamshell 1504. For example, this can datum the mount in the x-direction. Another rib (to be exemplified below) can datum the mount in other directions.

Figure 16:
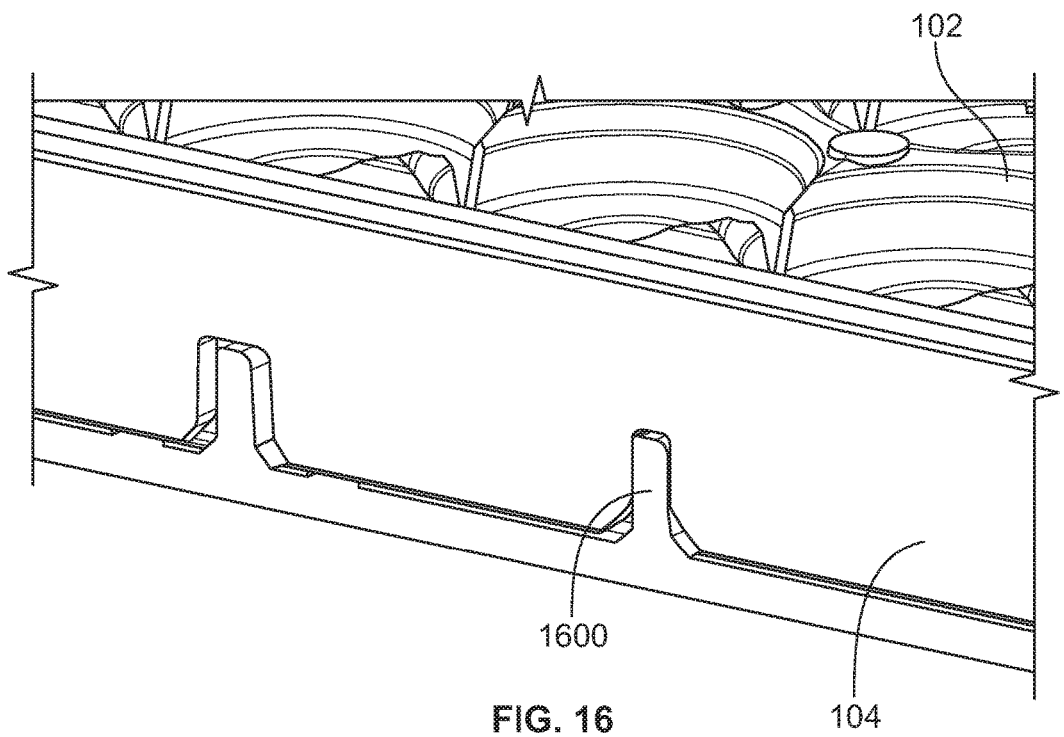
FIG. 16 shows an example of the mount of FIG. 1 being positioned using ribs in the clamshell.

FIG. 16 shows an example of the mount 104 of FIG. 1 being positioned using ribs 1600 in the clamshell 102. In this cross section, it can be seen how the ribs 1600 datum the mount in the y- and z-directions. For example, in the y-direction the datuming ensures that the mount is properly positioned along the length of the clamshell and does not extend too far on either side. As another example, in the z-direction the datuming ensures that the mount sits at a proper depth inside the slot of the clamshell (e.g., high enough to allow proper wicking of adhesive, yet low enough to ensure a stable bonding by the adhesive).

Figure 17:
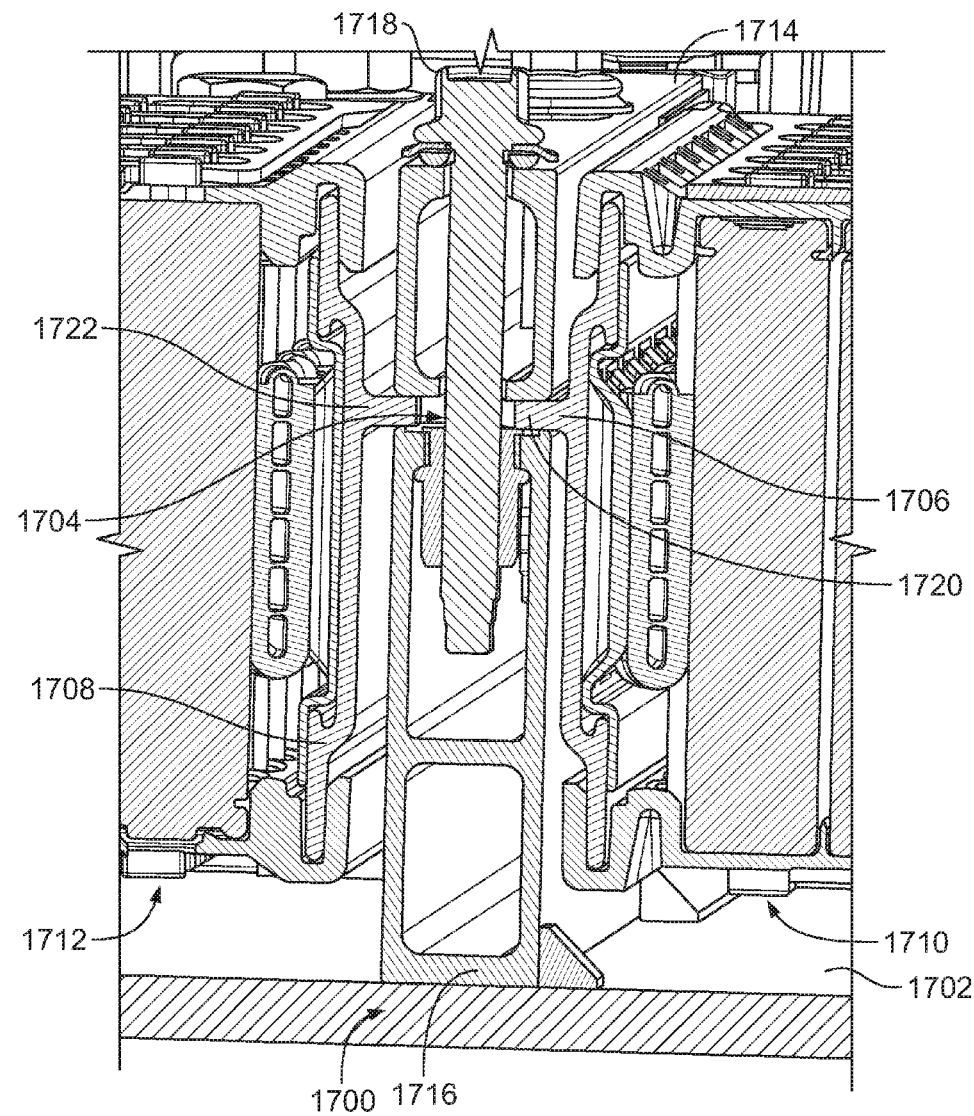
FIG. 17 shows an example of a member of an energy storage pack having a cross-member split for receiving mounts from cell modules.

FIG. 17 shows an example of a member 1700 of an energy storage pack 1702 having a cross-member split 1704 for receiving mounts 1706 and 1708 from cell modules 1710 and 1712. For example, the member 1700 can be a cross-member of an energy storage pack, wherein multiple cell modules are mounted inside the energy storage pack, in at least one bay, using one or more cross-members. Here, the member comprises an upper portion 1714 and a lower portion 1716, attached to each other by fastener 1718. This design creates the split 1704 where one or more flanges 1720 and 1722 can rest on the lower portion 1716.

One advantage of this arrangement is that modules in adjacent bays share the fastener 1718 and can be packed with higher volumetric energy density. The split 1704 can be approximately level with the centers of mass of the modules 1710 and 1712 (e.g., the center of mass for a module housing, a thermal-exchange tube, cells and adhesive) in some implementations. This can reduce the stress imparted on the interface between the mount and the clamshell during mechanical loading.

Figure 18:
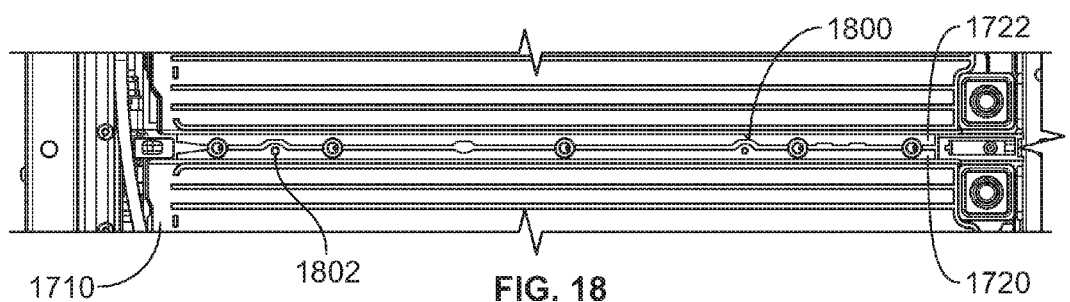
FIG. 18 shows an example elevated view of the mounts in FIG. 17.

FIG. 18 shows an example elevated view of the mounts in FIG. 17. Here, the upper portion 1714 (FIG. 17) of the member has not yet been put in place, and the flanges 1720 and 1722 are therefore visible. Each of the flanges has profile features 1800 that may interface with a corresponding feature on the other flange. By this design, the mounting flanges can be considered "half-width" in that a single upper cross-member can simultaneously fasten mounts of modules from adjacent bays. For example, the module 1710 that is here shown having the flange 1720, can on its other end have a flange corresponding to the flange 1722, in analogy with the above.

One or more pins 1802 can position the module on the lower cross-member during assembly. In some implementations, the pin passes through an opening on the flange of the mount. For example, this can allow electrical and coolant connections to be made to the modules before the module is mechanically restrained by the upper cross-member.

In at least some of the above examples the adhesive that attaches the cells and the tube to the clamshell also serves as a thermal interface material between the cells and the tube. Some implementations may not include this feature. Some implementations can provide a multi-step adhesion process wherein an adhesive is cured using at least radiation and a chemical cure mechanism. For example, such implementations include a method comprising: assembling a thermal-exchange tube in a module housing for an energy storage pack; assembling cells in the module housing, wherein the thermal-exchange tube runs between rows of the cells; applying an adhesive that affixes the cells and the thermal-exchange tube to the module housing; applying radiation that cures a first portion of the adhesive, wherein a second portion of the adhesive is shielded from the radiation by the cells or the thermal-exchange tube; and using a chemical cure mechanism to cure at least the second portion of the adhesive. As another example, such implementations include an energy storage pack comprising: a module housing; cells; and a thermal-exchange tube running between rows of the cells, the cells and the thermal-exchange tube affixed to the module housing by the adhesive, wherein a first portion of the adhesive is cured by applied radiation, wherein a second portion of the adhesive is shielded from the radiation by the cells or the thermal-exchange tube, and wherein the second portion of the adhesive is cured by a chemical cure mechanism. Each of the example method and energy storage pack mentioned above can include any other feature described herein.

FIG. 19 shows an example of a parallel cooling tube system 1900. Here, liquid for thermal-exchange (e.g., a coolant) enters the thermal-exchange area generally as indicated by arrow 1902, and exits generally as indicated by arrow 1904. In some implementations, one or more manifolds 1906 can be provided for the liquid. For example, one manifold can distribute the incoming liquid among multiple tubes 1908, and another manifold can collect the separate flows as the liquid exits the thermal-exchange area.

According to an aspect of the present disclosure as described in FIGS. 1-19, an energy storage pack includes a coolant inlet manifold, a coolant outlet manifold, and a plurality of thermal-exchange tubes extending between the coolant inlet manifold and the coolant outlet manifold to exchange heat between coolant passing through the plurality of thermal-exchange tubes and a plurality of battery cells mounted adjacent to and among the plurality of thermal-exchange tubes within the energy storage pack. In one embodiment, at least one of coolant inlet manifold and the coolant outlet manifold includes a plurality of thermal-exchange tube terminating structures and a plurality of hose segments intercoupling the plurality of thermal-exchange tube terminating structures. The energy storage pack may further include a coolant inlet opening located on the coolant inlet manifold and a coolant outlet opening located on the coolant outlet manifold.

At least one of the plurality of thermal-exchange tube terminating structures may include two half-tanks sandwiched to a corresponding end of a thermal-exchange tube and two hose barbs, each coupled to a corresponding half-tank. The two half-tanks, the two hose barbs, and the corresponding end of the thermal-exchange tube may be brazed together in a manufacturing process and the structure may further include teeth that crimp together the two half-tanks in preparation for brazing.

In some constructs, at least some of the thermal-exchange tubes comprise a first side surface, a second side surface, and a plurality of internal ribs coupling the first side surface to the second side surface. With this construct, the first side surface, the second side surface, and the plurality of internal ribs define a plurality of coolant passages. Further, at least some of the plurality of thermal-exchange tubes may have a scallop shape along its length, at least some of the scallops corresponding to battery cells.

The energy storage pack may include a first clamshell, a second clamshell joined to the first clamshell to form an enclosure, and a plurality of battery cells contained within the enclosure. With this structure, at least one of the plurality of thermal-exchange tubes resides adjacent to and provides heating and cooling to a corresponding group of battery cells of the plurality of battery cells. The first clamshell and the second clamshell may define a plurality of battery receipt locations. In such structure, the energy storage pack includes electronics at least partially residing adjacent the second clamshell and at least one thermal-exchange structure residing within at least one battery receipt location for exchanging heat between the electronics and at least some of the thermal-exchange tubes. The thermal-exchange structure may be a metal cylinder having a height greater than a height of at least one battery cell residing within an adjacent battery receipt location in some embodiments.

Figure 20A:
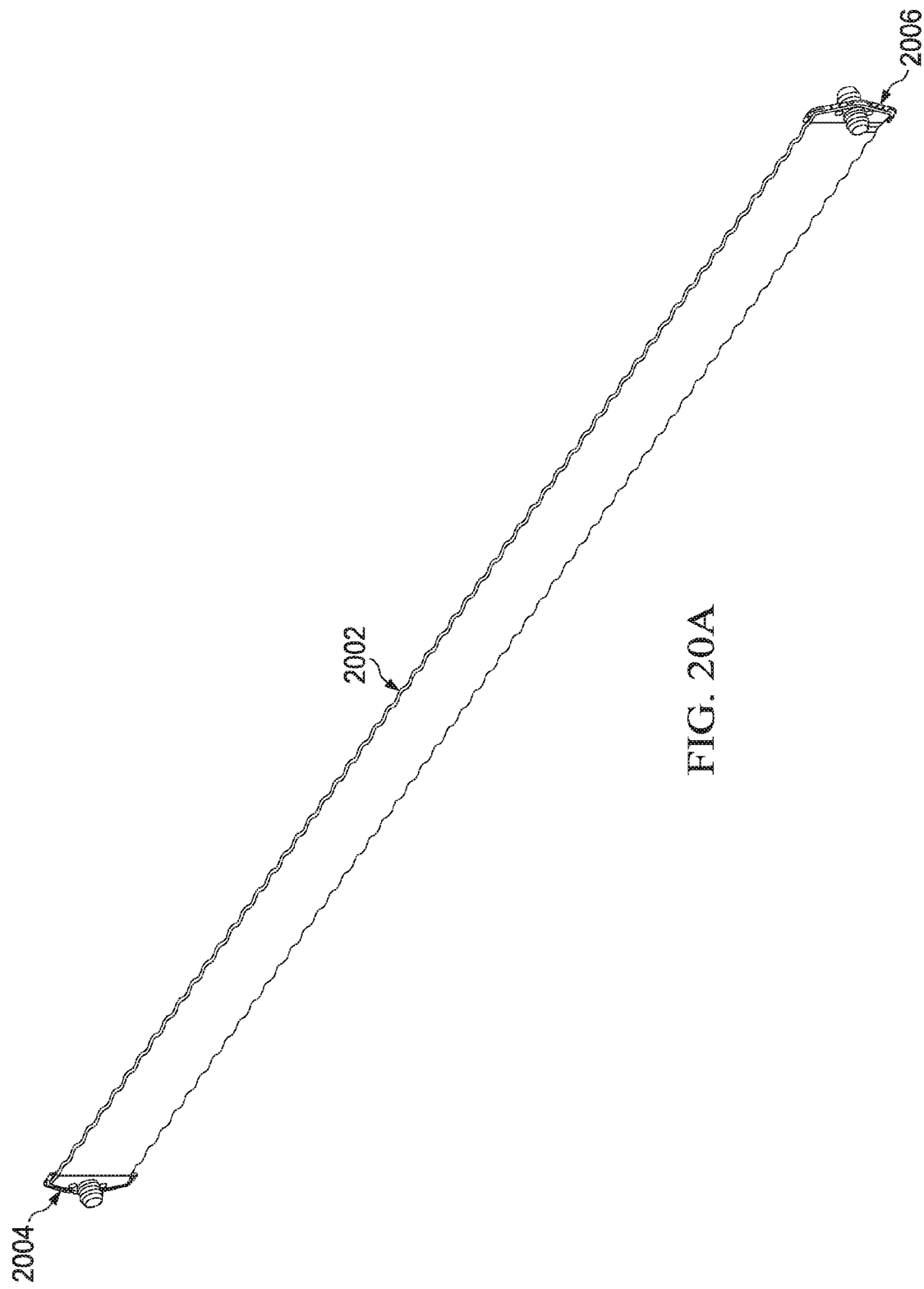
FIG. 20A is a perspective side view of a thermal-exchange tube with thermal-exchange tube terminating structures at each end.

FIG. 20A is a perspective side view of a thermal-exchange tube 2002 with thermal-exchange tube terminating structures 2004 and 2006 at each end. The thermal-exchange tube 2002 may be formed in the same or a similar manner as was described herein with reference to the formation of thermal-exchange tubes of differing overall shapes, e.g., with reference to FIGS. 9-11 and related text. One or more other constructs of the thermal-exchange tube 2002 will be described further herein with reference to FIGS. 26 and 27.

The thermal-exchange tube 2002 of FIG. 20A is substantially straight along its length and includes a scallop shape that corresponds to battery cells when installed. The scallop shape was described in detail with reference to FIG. 9 with the scallops formed during or after formation of the thermal-exchange tube itself. The thermal-exchange tube 2002 is formed of a metal, e.g., aluminum or another material that provides acceptable heat transfer between coolant that flows within the thermal-exchange tube 2002 and structures, e.g., battery cells and electronics, located external to the thermal-exchange tube 2002, that require heating/cooling.

Attached to each end of the thermal-exchange tube 2002 is a thermal-exchange tube terminating structure 2004 and 2006. The thermal-exchange tube terminating structures 2004 and 2006 are affixed to the thermal-exchange tube 2002 in a manufacturing process (after manufacture of the thermal-exchange tube 2002 in some embodiments). The thermal-exchange tube terminating structures 2004 and 2006 will be described in more detail with reference to FIGS. 21, 22, 23, 24, 25, 28, 29, and 30, herein. A first of the thermal-exchange tube terminating structures 2004 inlets coolant to the thermal-exchange tube 2002 and a second of the thermal-exchange tube terminating structures 2006 outlets coolant from the thermal-exchange tube 2002.

The thermal-exchange tube 2002 and the thermal-exchange tube terminating structures 2004 and 2006 may form a portion of the parallel cooling tube system 1900 of FIG. 19. The combination of the thermal-exchange tube 2002 and the thermal-exchange tube terminating structures 2004 and 2006 together form a unitary structure that may combined with other same/similar unitary structures as will be further described with reference to FIGS. 24, 25, 29, and 30, the parallel cooling tube system 1900. These unitary structures are assembled to create the parallel cooling tube system of FIG. 19. Referring to both FIG. 19 and FIG. 20, the unitary structures may be considered the tubes 1908 of FIG. 1 with hose segments 2410 (as will be described further herein with reference to FIGS. 25, 29, and 30) interconnecting the unitary structures. In another embodiment, the thermal-exchange tube terminating structures 2004 and 2006 may be considered as portions of the manifolds 1906 of the parallel cooling tube system 1900, although their functions are same/similar among the embodiments.

Figure 20B:
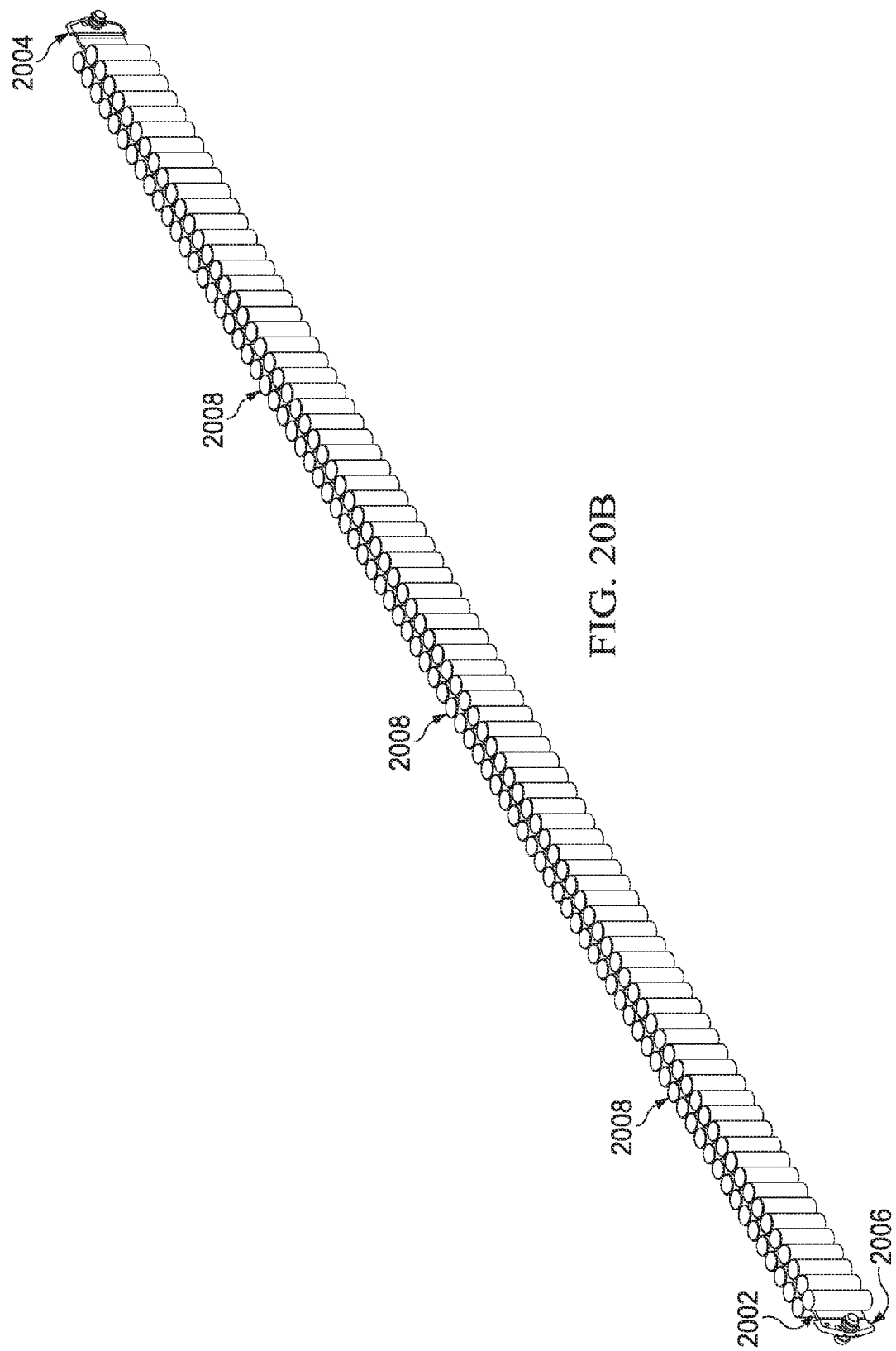
FIG. 20B is a perspective side view of the thermal-exchange tube with thermal-exchange tube terminating structures at each end as illustrated in FIG. 20A with a plurality of battery cells residing adjacent the thermal-exchange tube.

FIG. 20B is a perspective side view of the thermal-exchange tube with thermal-exchange tube terminating structures at each end as illustrated in FIG. 20A with a plurality of battery cells 2008 residing adjacent the thermal-exchange tube 2002. The structure of FIG. 20B will form a portion of an energy storage pack that will be described in greater detail with reference to FIGS. 24, 25, 26, 30, 31, and 322. In some embodiments, as will be described in detail with reference to FIGS. 25, 30, 31 and 32, some of the locations shown to locate battery cells 2008 may instead locate cylindrically shaped thermal-exchange structures that function to transfer heat between the thermal-exchange tube 2002 and electronics (or other items) that service the energy storage pack.

The battery cells 2008 of FIG. 20B may be one or more of the battery types previously described herein or, of another type. The battery cells 2008 are substantially cylindrical in shape, receive electrical energy during charging, convert the electrical energy to chemical energy, store the chemical energy, convert the chemical energy to electrical energy and produce electrical energy during discharging. For efficient operation, the battery cells 2008 should be kept within a temperature range. During these processes, the battery cells 2008 sink or produce heat. During non-use in a cold ambient environment, the battery cells 2008 cool. During non-use in a hot ambient environment, the battery cells 2008 heat. Thus, the energy storage pack heating and cooling system described herein operates to keep the battery cells 2008 within an efficient operating temperature range.

FIG. 21 is a partial perspective view of the thermal-exchange tube and thermal-exchange tube terminating structure of FIGS. 20A and 20B. As shown, the thermal-exchange tube terminating structures (2004 or 2006) is attached to the thermal-exchange tube 2002 to form a unitary structure.

Figure 22:
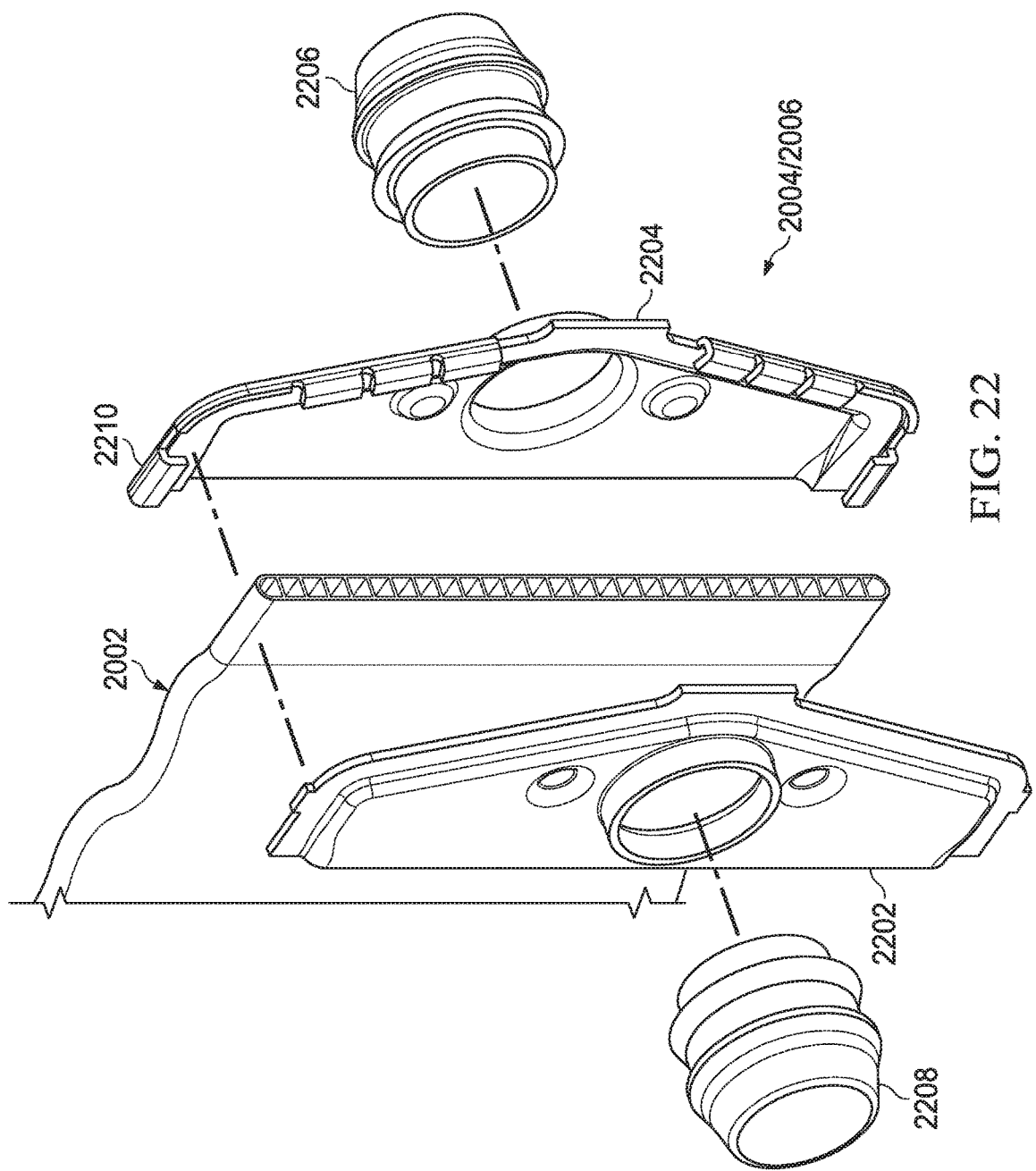
FIG. 22 is an exploded view of the thermal-exchange tube and thermal-exchange tube terminating structure of FIG. 21.

FIG. 22 is an exploded view of the thermal-exchange tube and thermal-exchange tube terminating structure of FIG. 21. Each of the plurality of thermal-exchange tube terminating structures 2004 and 2006 includes two half-tanks 2202 and 2204 sandwiched to a corresponding end of a thermal-exchange tube 2002. Each of the plurality of thermal-exchange tube terminating structures 2004 and 2006 also include two hose barbs 2206 and 2208, each coupled to a corresponding half-tank 2204 and 2202, respectively. In some embodiments, the two half-tanks 2202 and 2204, the two hose barbs 2206 and 2208, and the corresponding end of the thermal-exchange tube 2002 are brazed together. In some embodiments, teeth 2210 crimp together the two half-tanks 2202 and 2204 to hold them in place so that they may be brazed more easily. These teeth 2210 may be unitarily formed with the half-tank 2204 and/or be separate components.

Figure 23:
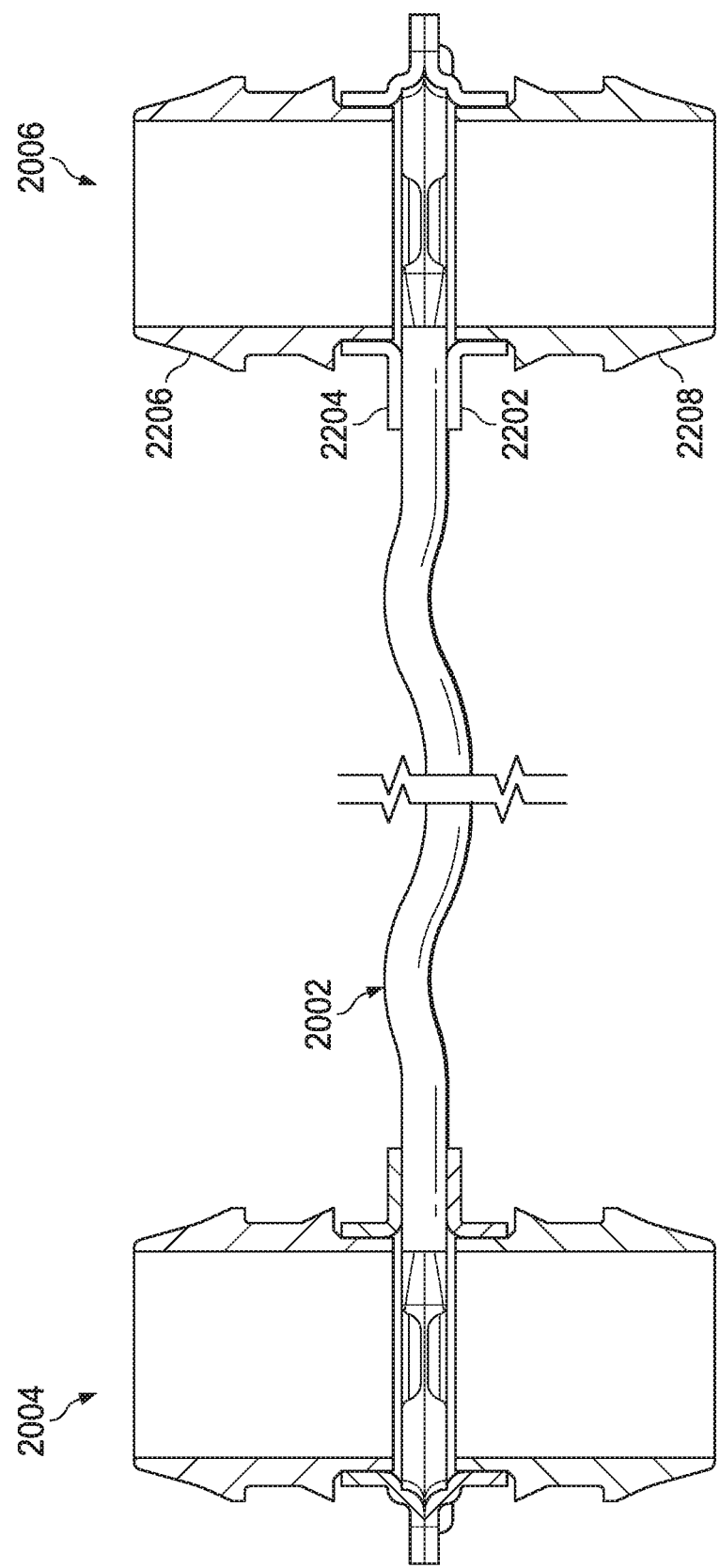
FIG. 23 is a longitudinal sectional side view of the thermal-exchange tube and thermal-exchange tube terminating structures of FIG. 20A.

FIG. 23 is a longitudinal sectional side view of the thermal-exchange tube 2002 and thermal-exchange tube terminating structures 2004 and 2006 of FIG. 20A. For the thermal-exchange terminating structure 2006, the two half-tanks 2202 and 2204 are sandwiched to a corresponding end of a thermal-exchange tube 2002 and the two hose barbs 2206 and 2208 each couple to a corresponding half-tank 2204 and 2202, respectively. Similar items for thermal-exchange tube terminating structure 2004 are of equivalent structure.

Figure 24:
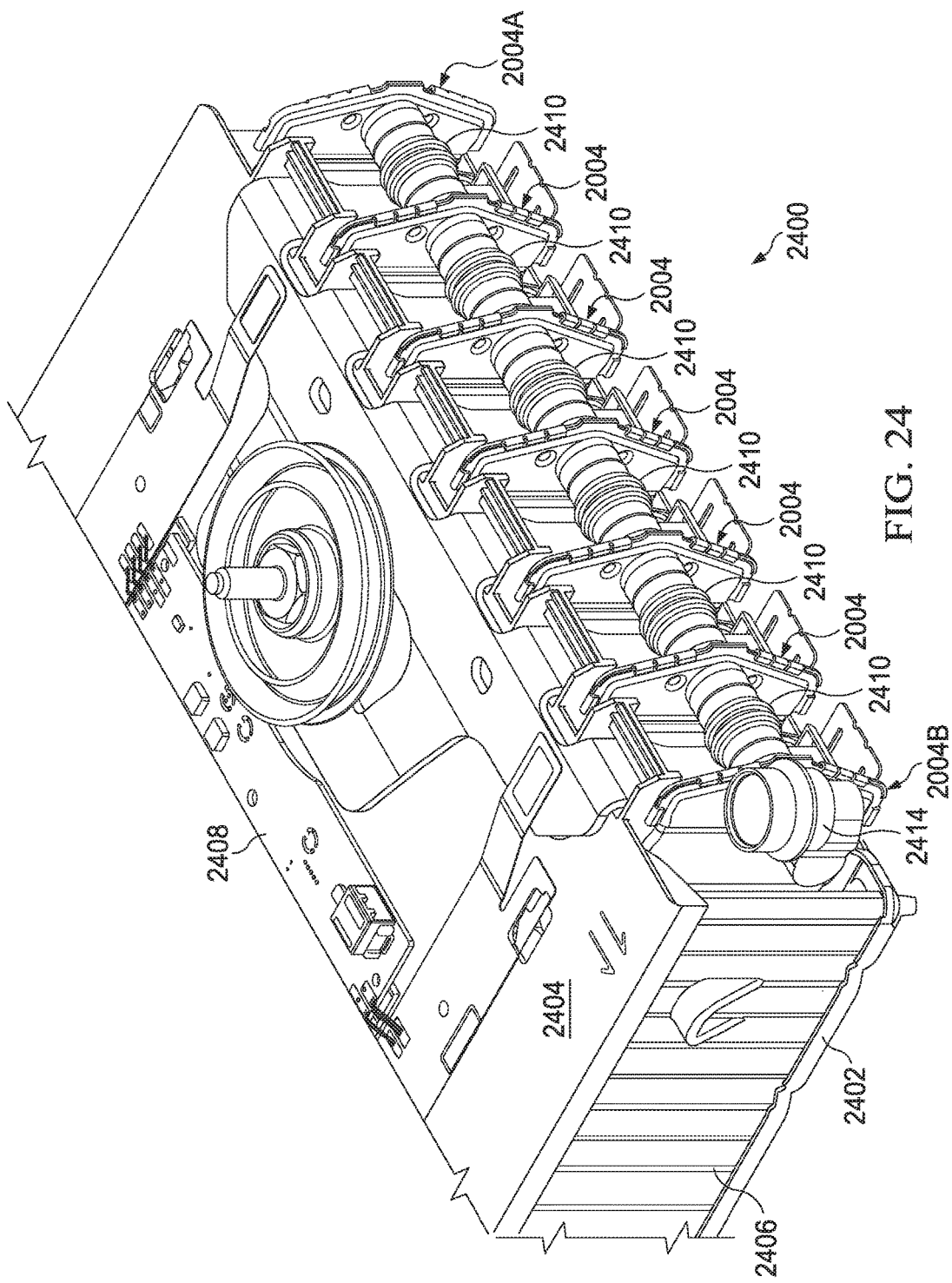
FIG. 24 is a partial perspective view of an energy storage pack detailing an upper portion and an end portion.

FIG. 24 is a partial perspective view of an energy storage pack 2400 detailing an upper portion and an end portion. The energy storage pack includes a first clamshell 2402 and a second clamshell 2404 joined to the first clamshell to form an enclosure. One of the first 2402 or second 2404 clamshells includes a side wall 2406 to complete the enclosure. In another embodiment, the side walls 2406 may be separate from the first 2402 and second 2404 clamshells and be joined together with the clamshells 2402 and 2404 to form the enclosure. Residing upon the second clamshell 2404 and partially contained within the enclosure are electronics 2408. These electronics 2408 provide interconnections for the battery cells contained within the enclosure, may include control circuitry for the energy storage pack 2400, may include power electronics, and/or may include other types of circuitry as well. These electronics 2408 may produce large amounts of heat during their operation and must be cooled to satisfactorily operate.

As was described with reference to FIGS. 1-8 and 12-17, the first clamshell 2402 and second clamshell 2404 define a plurality of battery receipt locations. A plurality of battery cells is contained within the enclosure and occupies corresponding battery receipt locations. In some embodiments, the battery receipt locations may support multiple battery cell sizes and types. Some of these battery receipt locations may hold placeholders 1400 instead of batteries. According to another aspect of the present invention, at least one of the plurality of thermal-exchange tubes 2002 resides adjacent to and provides heating and cooling to a corresponding group of battery cells of the plurality of battery cells within the battery receipt locations. According to another aspect of the present disclosure, at least one thermal-exchange structure resides within at least one battery receipt location and is for exchanging heat between the electronics 2408 and at least some of the thermal-exchange tubes 2002. Details regarding this aspect of the present invention will be described further with reference to FIGS. 25 and 30-32.

Hose segments 2410 intercouple the plurality of thermal-exchange tube terminating structures 2004 to form the coolant inlet manifold and a coolant inlet opening 2414 provides coolant to the coolant inlet manifold. A coolant outlet opening located on the coolant outlet manifold is not shown in FIG. 24 but resides on an opposite end of the energy storage pack 2400. The outermost thermal-exchange tube terminating structures 2004A and 2004B differ slightly from the inner thermal-exchange tube terminating structures 2004. Thermal-exchange tube terminating structure 2004A includes a closed end on one side instead of a hose barb.

Thermal-exchange tube terminating structure 2004B includes the coolant inlet opening 2414 on one side instead of a hose barb.

Figure 25:
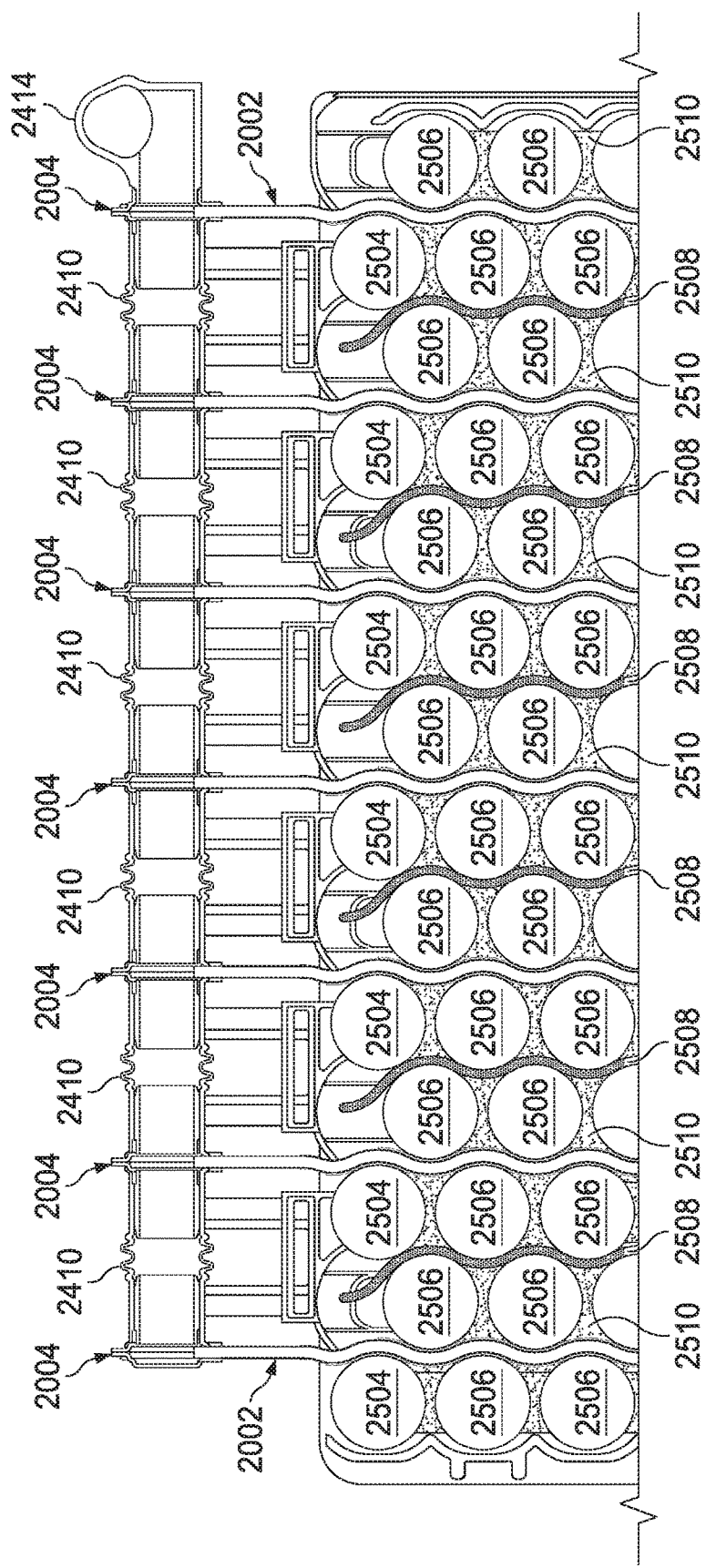
FIG. 25 is a partial sectional top view of the energy storage pack of FIG. 24.

FIG. 25 is a partial sectional top view of the energy storage pack of FIG. 24. The view of FIG. 25 shows thermal-exchange tubes 2002, a plurality of battery cells 2506 located adjacent the thermal-exchange tubes 2002, thermal-exchange structures 2504 located adjacent the thermal-exchange tubes 2002, and the coolant inlet manifold, which includes the thermal-exchange tube terminating structures 2004, the hose segments 2410, and the coolant inlet opening 2414.

The energy storage pack further includes interstitial strips 2508 residing between battery cells 2506 of differing rows. These interstitial strips 2508 may be strips of insulating material that run along a row of battery cells 2506 as shown. The energy storage pack further includes interstitial fill 2510 that resides between battery cells 2506 of a row of battery cells 2506 as shown. The interstitial fill 2510 may be poured in place as a liquid and hardened with UV light, allowed to harden over time, or otherwise cured among and between the battery cells 2506. The interstitial strips 2508 and interstitial fill 2510 reduce heat transfer rates between cells during their normal operation and also provide protection among battery cells 2506 during thermal events, e.g. a battery cell 2506 failure that emits heated gas and/or heated liquid. The interstitial strips 2508 and the interstitial fill 2510 significantly reduce convective and radiative heat transfer between battery cells 2506 compared with the air that they displace while minimally increasing conductive heat transfer between the battery cells 2506 and the thermal-exchange tubes 2002 as compared to the air they replace. Thus, the interstitial strips 2508 and the interstitial fill 2510 materially assist in preventing thermal runaway of the battery cells 2506 of the energy storage pack 2400 during a battery cell 2506 failure condition. Specific materials that may be used for the interstitial strips 2508 and/or interstitial fill 2510 includes silicone, silicone foam, syntactic silicone foam, glass (SiO2) fibers, and ceramic (Al2O3) fibers. As will be described further with reference to FIG. 27, the thermal-exchange tube 2002 may have material glued thereon that assists in preventing thermal runaway.

Figure 27:
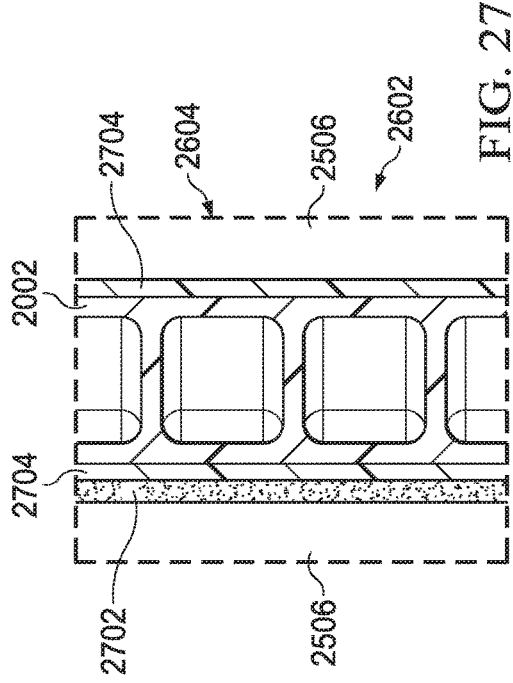
FIG. 27 is a partial sectional side view of the thermal-exchange tube of FIG. 26.
Figure 26:
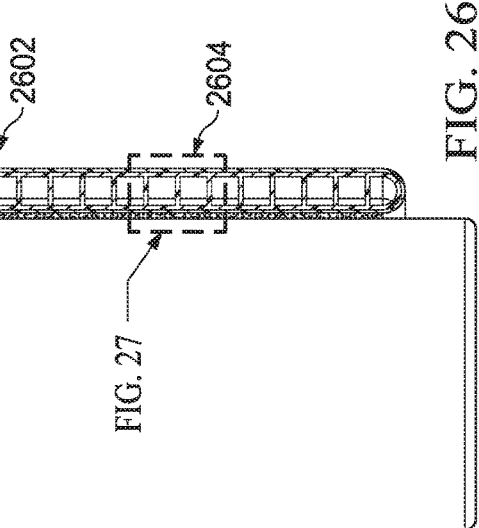
FIG. 26 is a diagrammatic sectional side view of the battery cell and the thermal-exchange tube of FIG. 20B.

FIG. 26 is a diagrammatic sectional side view of the battery cell and the thermal-exchange tube of FIG. 20B. Illustrated in FIG. 26 is a battery cell 2506 and a particular embodiment of a thermal-exchange tube 2602. FIG. 27 is a partial sectional side view of the thermal-exchange tube 2602 of FIG. 26 at detail 2604. As shown in FIG. 27, an insulating material 2704 is secured to thermal-exchange tube 2002 and glue 2702 datums/secures the insulating material (and thermal-exchange tube 2002) to the battery cell 2506. Securing/datuming the thermal-exchange tube 2602 to the battery cell 2506 (and other battery cells) minimizes the conduction path length and therefore the conductive thermal resistance between the thermal-exchange tube 2002 and the battery cell 2506 to enable more efficient thermal exchange between coolant passing in the thermal-exchange tube 2002 and the battery cell 2506. Securing the thermal-exchange tube 2002 to the battery cell 2506 in this manner minimizes thermal contact resistance by displacing interfacial air with the more thermally conductive elements, the insulating material 2704 and the glue 2702.

Note that on the right side of FIG. 26, there is no glue because this side of the thermal-exchange tube is not adhered to a battery cell. The insulating material 2704 not only provides electrical isolation between battery cells 2506 and the thermal-exchange tube 2002 but assists in preventing thermal runaway upon a failure of one or more battery cells 2506 within the energy storage pack 2400.

Figure 28:
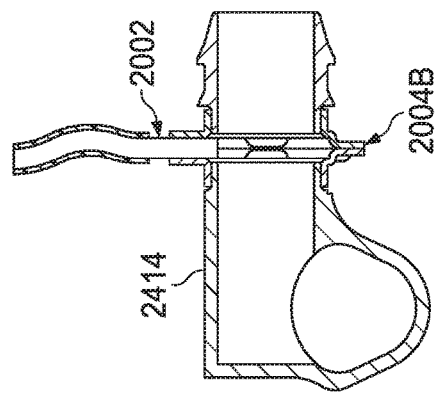
FIG. 28 is a partial sectional view of an end of the thermal-exchange tube and thermal-exchange tube terminating structure of FIG. 24.

FIG. 28 is a partial cross-sectional view of an end of the thermal-exchange tube and thermal-exchange tube terminating structure of FIG. 24. As shown, thermal-exchange tube 2002 affixes to thermal-exchange tube terminating structure 2004B, which includes coolant inlet opening 2414. A heating/cooling system services the thermal system described herein. This heating/cooling system includes in various embodiments, coolant tubing, one or more pumps, a chiller, a radiator, and/or a heater. These components are generally known and are not described further herein.

FIG. 29 is a partial sectional view of an end of the thermal-exchange tube and thermal-exchange tube terminating structure of FIG. 24 detailing the interconnection between thermal-exchange tube terminating structures by a hose segment 2410. Shown in FIG. 29 are thermal-exchange tubes 2002, thermal-exchange tube terminating structures 2004 including hose barbs 2206 and 2208, and a hose segment 2410 coupling hose barbs 2206 and 2208. The exchange tube terminating structure of FIG. 29 may be either an inlet or outlet port when coolant flows in a single direction. However, in some embodiments, coolant flows in both directions and either thermal-exchange terminating structure may support both inlet and outlet flow of coolant.

Figure 30:
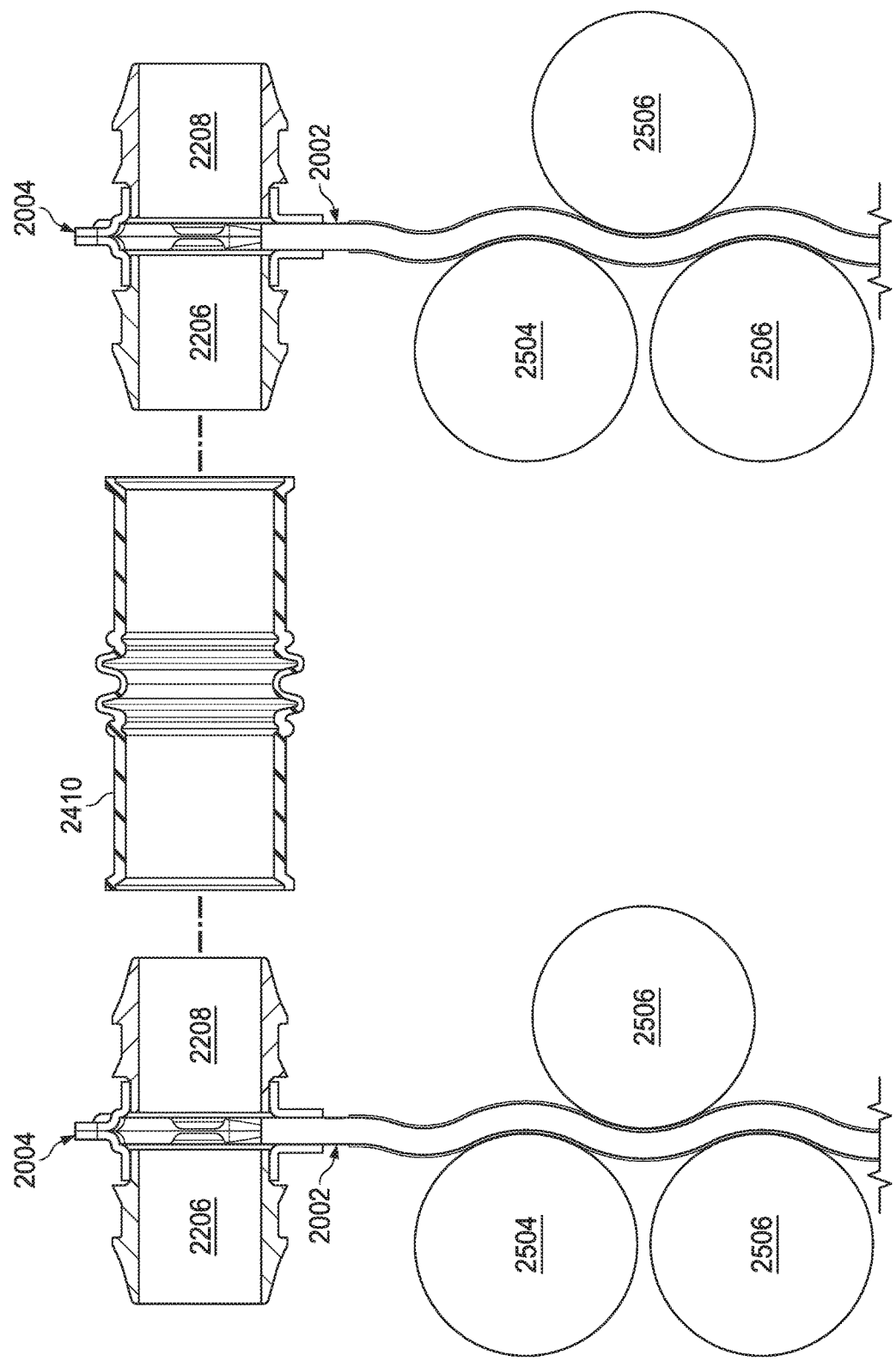
FIG. 30 is an exploded partial sectional view of an end of the thermal-exchange tube and thermal-exchange tube terminating structure of FIG. 29 detailing the interconnection between thermal-exchange tube terminating structures and battery cells and the thermal-exchange tube.

FIG. 30 is an exploded partial sectional view of an end of the thermal-exchange tube and thermal-exchange tube terminating structure of FIG. 29 detailing the interconnection between thermal-exchange tube terminating structures and battery cells and the thermal-exchange tube. Shown in FIG. 30 are thermal-exchange tubes 2002, thermal-exchange tube terminating structures 2004 including hose barbs 2206 and 2208, and hose segment 2410 coupling hose barbs 2206 and 2208. Also, shown in FIG. 30 are battery cells 2506 and thermal-exchange structures 2504 residing within at least one battery receipt location for exchanging heat between the electronics and at least some of the thermal-exchange tubes 2002. In the embodiment of FIG. 30, the thermal-exchange structures 2504 comprises metal cylinders having a height greater than a height of at least one battery cell 2506 residing within an adjacent battery receipt location.

Figure 31:
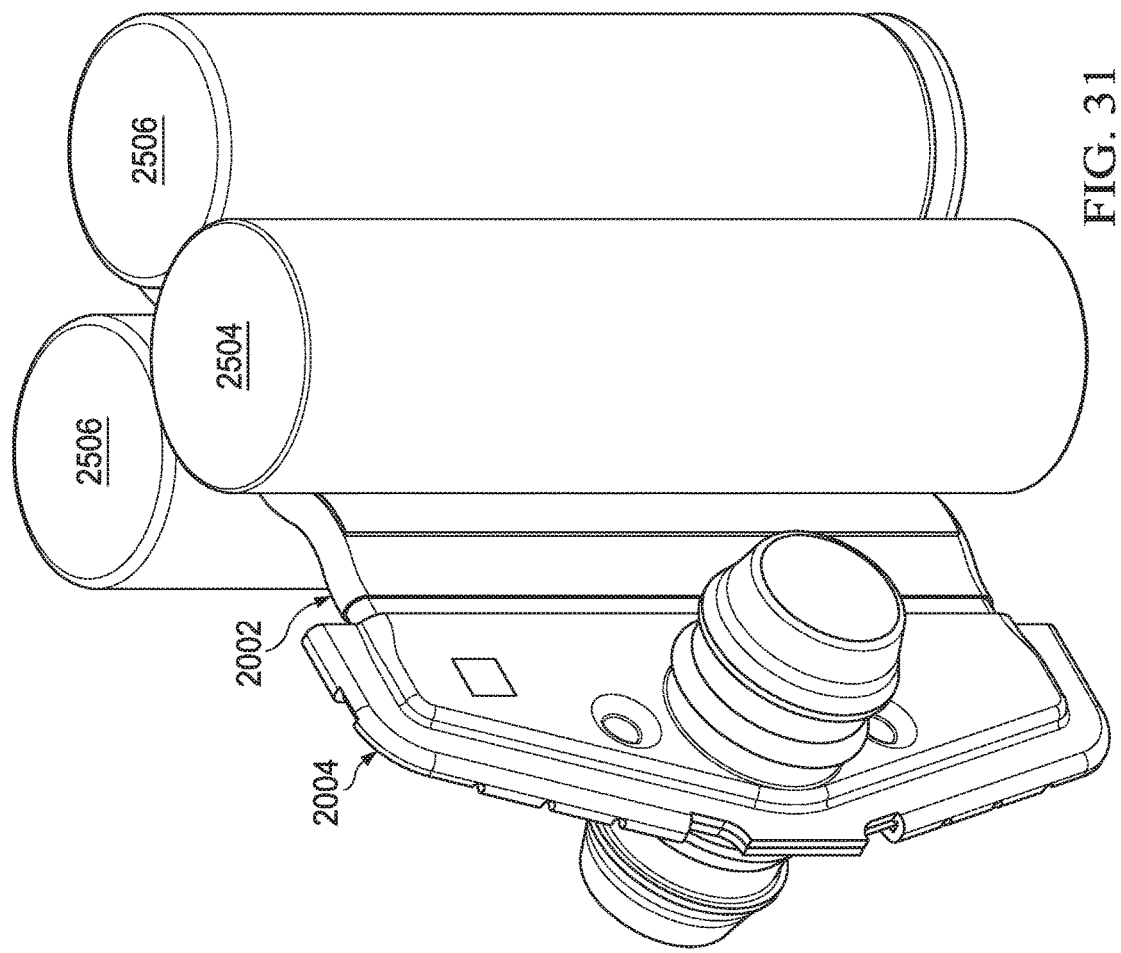
FIG. 31 is a partial perspective view of the thermal-exchange tube and thermal-exchange tube terminating structure of FIGS. 20A and 20B showing how battery cells and a thermal-exchange structure abut/couple to the thermal-exchange tube.

FIG. 31 is a partial perspective view of the thermal-exchange tube and thermal-exchange tube terminating structure of FIGS. 20A and 20B showing how battery cells and a thermal-exchange structure abut/couple to the thermal-exchange tube. Illustrated are a thermal-exchange tube 2002, a thermal-exchange tube terminating structure 2004, battery cells 2506 and thermal-exchange structure 2504. In the embodiment of FIG. 31, the thermal-exchange structure 2504 is a metal cylinder having a height greater than a height of at least one battery cell 2506 residing within an adjacent battery receipt location.

Figure 32:
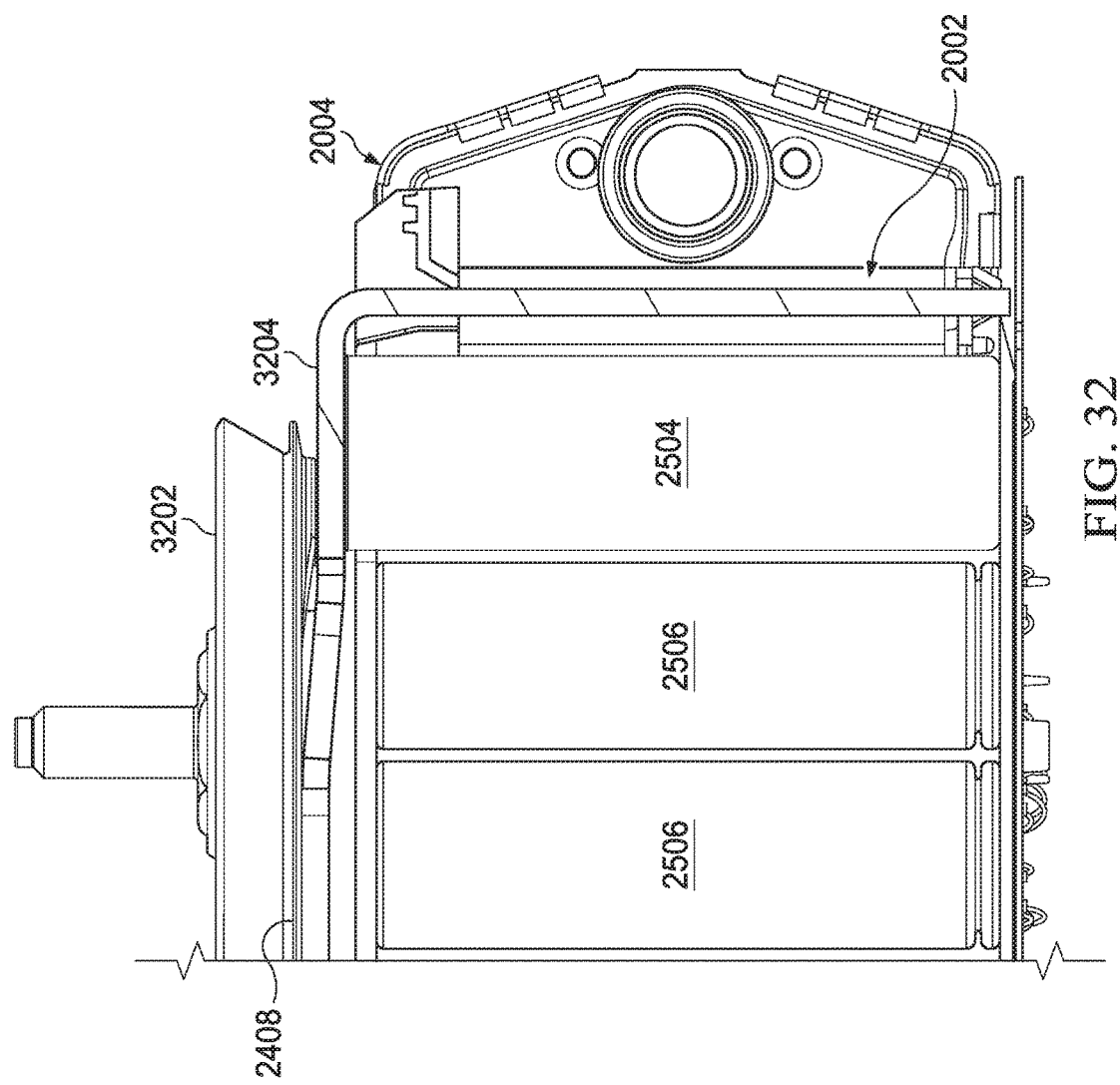
FIG. 32 is a partial sectional side view of the energy storage pack of FIG. 24 showing the thermal-exchange tube, the thermal-exchange tube terminating structure of FIGS. 20A and 20B, electronics, battery cells and a thermal-exchange structure.

FIG. 32 is a partial sectional side view of the energy storage pack of FIG. 24 showing the thermal-exchange tube, the thermal-exchange tube terminating structure of FIGS. 20A and 20B, electronics, battery cells and a thermal-exchange structure. FIG. 32 shows thermal-exchange tube 2002, a thermal-exchange tube terminating structure 2004, battery cells 2506, thermal-exchange structure 2504, electronics 2408, a mounting structure 3202, and. In the embodiment of FIG. 31, the thermal-exchange structure 2504 is a metal cylinder having a height greater than a height of at least one battery cell 2506 residing within an adjacent battery receipt location. Further included in the embodiment of FIG. 32 is a second thermal-exchange structure 3204 located between the thermal-exchange structure 2504 and the electronics 2408 and exchanges thermal energy between the electronics 2408 and the thermal-exchange structure 2504. In the embodiment of FIG. 32, the second thermal-exchange structure is a metal plate bent to fit the dimensions and shape of the enclosure and also to interface with the thermal-exchange structure 2504.

FIG. 33 is a flow chart illustrating a method 3300 for constructing a combined thermal-exchange tube/thermal-exchange tube terminating structure. The method 3300 includes first extruding material to form a thermal-exchange tube (Step 3302). In some embodiments, the metal being extruded is aluminum, another metal, or plastic. The method 3300 then includes optionally applying scallops to the thermal-exchange tube (step 3304). The method 3300 then includes coupling two half-tanks to a corresponding end of the thermal-exchange tube (Step 3306). The method 3300 then optionally includes applying teeth (using crimping, for example) to the two half-tanks to hold them together (Step 3308). The teeth that assist in the manufacturing process may be integral with one of the half-tanks and/or separate from the half-tanks. Crimped Teeth on the half-tanks is not the only way to hold these pieces together to enable easy brazing. Resistance welding, laser welding, clinching, or other processes may also be used to couple the half-tanks to one another.

The method 3300 continues with applying hose barbs to the half-tanks (step 3310). However, as was described with reference FIGS. 24, 25, and 28, some thermal-exchange tube terminating structures include coolant inlets/outlets and others have one closed side. Thus, step 3310 is altered accordingly for these constructs. The method 3300 concludes with brazing together the two half-tanks, the two hose barbs, and the corresponding end of the thermal-exchange tube (Step 3312). The method 3300 is then repeated for the opposite end of the thermal-exchange tube.

In some embodiments, applying scallops to the thermal-exchange tube is performed during the extruding process of step 3302. In other embodiments, applying scallops to the thermal-exchange tube is performed after the extruding process of step 3302.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. An energy storage pack comprising:
   a coolant inlet manifold;
   a coolant outlet manifold, wherein at least one of the coolant inlet manifold and the coolant outlet manifold comprises:
     a plurality of thermal-exchange tube terminating structures; and
     a plurality of hose segments intercoupling the plurality of thermal-exchange tube terminating structures; and
   a plurality of thermal-exchange tubes extending between the coolant inlet manifold and the coolant outlet manifold to exchange heat between coolant passing through the plurality of thermal-exchange tubes and a plurality of battery cells mounted adjacent to and among the plurality of thermal-exchange tubes within the energy storage pack.

2. The energy storage pack of claim 1, wherein at least some of the plurality of thermal-exchange tubes comprise a first side surface, a second side surface, and a plurality of internal ribs coupling the first side surface to the second side surface.

3. The energy storage pack of claim 2, wherein the first side surface, the second side surface, and the plurality of internal ribs define a plurality of coolant passages.

4. The energy storage pack of claim 1, wherein at least some of the plurality of thermal-exchange tubes comprise scallop shapes along its length, at least some of the scallop shapes corresponding to battery cells.

5. An energy storage pack comprising:
   a coolant inlet manifold;
   a coolant outlet manifold;

a plurality of thermal-exchange tubes extending between the coolant inlet manifold and the coolant outlet manifold;

a first clamshell;

a second clamshell joined to the first clamshell to form an enclosure, the first clamshell and the second clamshell defining a plurality of battery receipt locations;

electronics at least partially residing adjacent the second clamshell;

a plurality of battery cells contained within the enclosure and residing within some of the plurality of battery receipt locations; and a metal cylinder thermal-exchange structure having a height greater than a height of at least one battery cell and residing within a battery receipt location of the plurality of battery receipt locations, wherein at least one of the plurality of thermal-exchange tubes resides adjacent to and provides heating and cooling to a corresponding group of battery cells of the plurality of battery cells and to the metal cylinder thermal-exchange structure.

6. The energy storage pack of claim 1, wherein at least one of the plurality of thermal-exchange tube terminating structures comprises:

two half-tanks sandwiched to a corresponding end of a thermal-exchange tube of the plurality of thermal exchange tubes; and two hose barbs, each coupled to a corresponding half-tank.

7. The energy storage pack of claim 6, wherein the two half-tanks, the two hose barbs, and the corresponding end of the thermal-exchange tube are brazed together.

8. The energy storage pack of claim 7, further comprising teeth that crimp together the two half-tanks.

9. The energy storage pack of claim 1, further comprising:

a coolant inlet opening located on the coolant inlet manifold; and a coolant outlet opening located on the coolant outlet manifold.

10. An energy storage pack comprising:

a first clamshell;

a second clamshell joined to the first clamshell to form an enclosure, the first clamshell and the second clamshell defining a plurality of battery receipt locations;

a plurality of battery cells residing within at least some of the plurality of battery receipt locations;

a heating/cooling system comprising:

a plurality of thermal-exchange tubes running adjacent to and providing heating and cooling to the plurality of battery cells;

a coolant inlet manifold coupled to first ends of the plurality of thermal exchange tubes; and a coolant outlet manifold coupled to second ends of the plurality of thermal exchange tubes, wherein at least one of the coolant inlet manifold and the coolant outlet manifold comprises:

a plurality of thermal-exchange tube terminating structures; and a plurality of hose segments intercoupling the plurality of thermal-exchange tube terminating structures;

electronics at least partially residing adjacent the second clamshell; and at least one thermal-exchange structure residing within at least one of the plurality of battery receipt locations to exchange heat between the electronics and the plurality of thermal-exchange tubes.

11. The energy storage pack of claim 10, wherein, wherein the at least one thermal-exchange structure comprises a cylinder having a height greater than a height of a battery cell residing within an adjacent battery opening.

12. The energy storage pack of claim 10, further comprising a second thermal-exchange structure located between the at least one thermal-exchange structure and the electronics.

13. The energy storage pack of claim 12, wherein the second thermal-exchange structure comprises a metal plate.

14. The energy storage pack of claim 10, wherein at least one of the plurality of thermal-exchange tube terminating structures comprises:

two half-tanks sandwiched to a corresponding end of a thermal-exchange tube of the plurality of thermal-exchange tubes; and two hose barbs, each coupled to a corresponding half-tank.

15. The energy storage pack of claim 14, wherein the two half-tanks, the two hose barbs, and the corresponding end of the thermal-exchange tube are brazed together.

16. The energy storage pack of claim 10, wherein at least some of the thermal-exchange tubes comprise a first side surface, a second side surface, and a plurality of internal ribs coupling the first side surface to the second side surface.

17. The energy storage pack of claim 16, wherein the first side surface, the second side surface, and the plurality of internal ribs define a plurality of coolant passages.

18. The energy storage pack of claim 10, wherein at least some of the plurality of thermal-exchange tubes comprise scallop shapes along its length, at least some of the scallop shapes corresponding to battery cells.

19. The energy storage pack of claim 5, further comprising a plurality of thermal-exchange tube terminating structures, at least some of which include:

two half-tanks sandwiched to a corresponding end of a thermal-exchange tube of the plurality of thermal-exchange tubes; and two hose barbs, each coupled to a corresponding half-tank.

20. The energy storage pack of claim 19, wherein the two half-tanks, the two hose barbs, and the corresponding end of the thermal-exchange tube are brazed together.

21. The energy storage pack of claim 20, further comprising teeth that crimp together the two half-tanks.

\* \* \* \* \*